United States Patent
Jen et al.

(10) Patent No.: US 12,113,893 B2
(45) Date of Patent: Oct. 8, 2024

(54) NON-CUSTODIAL TOOL FOR DATA ENCRYPTION AND DECRYPTION WITH DECENTRALIZED DATA STORAGE AND RECOVERY

(71) Applicant: Magic Labs, Inc., San Francisco, CA (US)

(72) Inventors: Fei-Yang Jen, New York, NY (US); Yi Wei Chen, San Francisco, CA (US); Dheeban Srinivasan Govindarajan, Mill Creek, WA (US); Jaemin Jin, New York, NY (US); Shang Li, Sunnyvale, CA (US)

(73) Assignee: Magic Labs, Inc., San Francisco, CA (US)

( * ) Notice: Subject to any disclaimer, the term of this patent is extended or adjusted under 35 U.S.C. 154(b) by 0 days.

(21) Appl. No.: 18/444,480

(22) Filed: Feb. 16, 2024

(65) Prior Publication Data
US 2024/0283636 A1    Aug. 22, 2024

Related U.S. Application Data

(60) Provisional application No. 63/611,038, filed on Dec. 15, 2023, provisional application No. 63/485,847, filed on Feb. 17, 2023.

(51) Int. Cl.
| H04L 9/40 | (2022.01) |
| H04L 9/08 | (2006.01) |
| H04L 9/32 | (2006.01) |

(52) U.S. Cl.
CPC ............ *H04L 9/083* (2013.01); *H04L 9/3247* (2013.01)

(58) Field of Classification Search
CPC .............................. H04L 9/083; H04L 9/3247
See application file for complete search history.

(56) References Cited

U.S. PATENT DOCUMENTS

| 7,500,100 B1 * | 3/2009 | Kobozev ............... H04L 9/3263 |
| | | 713/168 |
| 10,225,084 B1 | 3/2019 | Machani |
| | | (Continued) |

FOREIGN PATENT DOCUMENTS

| CN | 114788226 A | 7/2022 |
| WO | 2021062020 A1 | 4/2021 |

OTHER PUBLICATIONS

Docs, Privy, https://docs.privy.io, printed Feb. 16, 2024, 2 pages.
(Continued)

*Primary Examiner* — Ghodrat Jamshidi
(74) *Attorney, Agent, or Firm* — Blank Rome LLP

(57) ABSTRACT

This disclosure relates to techniques for performing encryption and decryption operations and that provide fully non-custodial data management, i.e., where end-users have control over their data—rather than a third party. Specifically, the techniques disclosed herein are configured to allow end-users to have the ability to recover and/or maintain access to data stored on third-party systems—even if one or more third-party entities storing the data are no longer in compliance with a predetermined set of operational criteria. In other implementations, novel split private key generation techniques are disclosed, wherein a newly-generated private key may be split into at least three shards, e.g., an authentication service provider shard, a shard for another entity, and a "recovery" shard. In still other implementations, an iFrame may decrypt separate shards of a private key using a delegated key management system (DKMS) and then use the reconstructed private key to sign a digital transaction.

19 Claims, 16 Drawing Sheets

(56) References Cited

U.S. PATENT DOCUMENTS

| | | |
|---|---|---|
| 10,454,683 B2 | 10/2019 | Weimer |
| 10,742,422 B1 | 8/2020 | Jarjoui |
| 11,159,326 B1* | 10/2021 | Nelson .................. G06F 3/0484 |
| 11,184,337 B2* | 11/2021 | Hathaway ............. H04L 63/061 |
| 11,477,014 B1* | 10/2022 | Frasco .................. H04L 9/0662 |
| 11,546,321 B2 | 1/2023 | Jen |
| 11,818,120 B2 | 11/2023 | Jen |
| 2005/0160298 A1 | 7/2005 | Reno |
| 2007/0192842 A1 | 8/2007 | Beaulieu |
| 2011/0239285 A1 | 9/2011 | Shi |
| 2013/0074158 A1 | 3/2013 | Koskimies |
| 2013/0311773 A1 | 11/2013 | Solin |
| 2014/0351586 A1 | 11/2014 | Hook |
| 2014/0373126 A1 | 12/2014 | Hussain |
| 2016/0323244 A1 | 11/2016 | Carncross |
| 2016/0366122 A1 | 12/2016 | Rykowski |
| 2017/0109752 A1 | 4/2017 | Hubbard |
| 2018/0212762 A1 | 7/2018 | Peddada |
| 2018/0302400 A1 | 10/2018 | Covdy |
| 2018/0330368 A1 | 11/2018 | Slupesky |
| 2018/0349891 A1 | 12/2018 | Putre |
| 2019/0220859 A1 | 7/2019 | Weight |
| 2019/0268153 A1 | 8/2019 | Kurian |
| 2019/0280864 A1 | 9/2019 | Cheng |
| 2019/0305952 A1 | 10/2019 | Hamel |
| 2020/0213323 A1 | 7/2020 | Krstic |
| 2020/0219094 A1* | 7/2020 | Dikhit ................ G06Q 20/4014 |
| 2021/0092108 A1 | 3/2021 | Jen |
| 2021/0217006 A1* | 7/2021 | Ragavan ............. G06Q 20/3829 |
| 2021/0288794 A1 | 9/2021 | O'Neill et al. |
| 2022/0014367 A1 | 1/2022 | Law et al. |
| 2022/0166605 A1 | 5/2022 | Suurkivi et al. |
| 2022/0248228 A1 | 8/2022 | Mattsson |
| 2023/0260037 A1* | 8/2023 | Mussallem .......... G06Q 20/389 705/35 |
| 2023/0275757 A1* | 8/2023 | Chiplunkar ........... H04L 9/3239 713/164 |
| 2023/0336361 A1* | 10/2023 | Cardenes Cabre et al. ................. H04L 9/50 |
| 2023/0344642 A1* | 10/2023 | Heart .................... H04L 9/3255 |
| 2023/0376941 A1 | 11/2023 | Jin |

OTHER PUBLICATIONS

How Web3Auth Works?, https://web3auth.io/docs/how-web3auth-works, printed Feb. 16, 2024, 9 pages.

Web3Auth Wallet Management Infrastructure, https://web3auth.io/docs/infrastructure/, printed Feb. 16, 2024, 10 pages.

International Search Report and the Written Opinion of the International Searching Authority, dated May 31, 2024, issued in PCT/US24/16296.

* cited by examiner

NON-CUSTODIAL TOOL FOR DATA ENCRYPTION AND DECRYPTION WITH DECENTRALIZED DATA STORAGE AND RECOVERY

CROSS-REFERENCE TO RELATED APPLICATIONS

This application is related to U.S. Pat. No. 11,546,321, filed Sep. 24, 2020, issued Jan. 3, 2023, and entitled "Non-Custodial Tool for Building Decentralized Computer Applications" (hereinafter, "the '321 patent"). The '321 patent is hereby incorporated by reference in its entirety. This application also claims priority to U.S. Provisional Patent Application Ser. No. 63/485,847, filed Feb. 17, 2023, and entitled "Non-Custodial Tool for Data Encryption and Decryption with Decentralized Data Storage and Recovery" (hereinafter, "the '847 application") and U.S. Provisional Patent Application Ser. No. 63/611,038, filed Dec. 15, 2023, and entitled "Non-Custodial Tool for Data Encryption and Decryption with Decentralized Data Storage and Recovery" (hereinafter, "the '038 application"). The '847 application and the '038 application are hereby incorporated by reference in their entireties.

TECHNICAL FIELD

This disclosure relates generally to systems, methods, and computer readable media to perform decentralized key generation, transaction signing, and encryption and decryption operations that provide for fully non-custodial data management, where the users have control over their data instead of a third party. More particularly, the systems, methods, and computer readable media are configured to allow users to recover and/or maintain access to data stored on third-party systems—even if one or more third-party entities storing the data become non-operational and/or can no longer provide their storage services.

BACKGROUND

Keeping user data secure has been an important issue for a long time. Most applications today are built with centralized data storage and without proper security models to safeguard sensitive user data and information. For example, an application implements usernames and passwords to authenticate its users with a centralized database. It is often only a matter of time before sensitive data, such as passwords, get stolen by sophisticated hackers with sufficient motives to do so.

In fact, even hashed and salted passwords are insecure. Once a centralized database of hashed passwords is stolen, hackers can direct immense distributed computing resources at the database, utilizing parallel GPUs or botnets with hundreds of thousands of nodes to attempt a brute-force attack on the stolen database. This not only applies to passwords but also to other sensitive datasets stored in a centralized database.

In the password example above, once the attacker discovers a password that hashes to the same hash as the one stored in the database, they will take that password and try it on other applications like bank accounts. In many cases, a salted and hashed password database can give up another valid password due to poor security implementation and controls. This results in about half a million leaked passwords per year-doubling every few years. The situation becomes more severe when companies/applications use passwords as secrets to encrypt sensitive data (symmetric encryption), where the encryption key is a weak password that can easily be cracked by brute force approaches.

To address the security flaws in the architecture of the centralized storage of sensitive data, application developers have started to utilize key management systems that encrypt and decrypt data. One of the use cases is to use a key management system to encrypt and decrypt a private key for authentication.

In short, a private key can be used to sign a piece of information jointly agreed upon between the applications and the end-users to generate signatures as proof of identity, removing the need for a password. In other words, an encryption-and-decryption system, like a delegated key management system (DKMS), which may, itself, include and/or use one or more key management systems (KMSs), can be used as a key-based authentication system that avoids having the users reveal their passwords, private keys, seed phrases, or other types of secrets to validate their identities. As used herein, the term "KMS" refers to a third party or remote KMS that is not part of the authentication system. In other words, the KMS operates as a separate system and/or service than the authentication system. Separate security credentials, e.g., scoped credentials, such as those described in the '321 patent are used to access the KMS. Merely having the ability to access the authentication system does not give an entity access to the KMS itself. DKMS improves private key security by decentralizing the authentication process. Specifically, a DKMS delegates certain encryption and decryption operations to other independent and trusted execution environments. Encryption and decryption processes using a DKMS are described in more detail in the '321 patent.

The encryption and decryption operations completely bypass what traditionally is the authentication service provider, such that the authentication system never obtains or sees the user's raw private keys. Having encryption and decryption operations isolated and segregated across multiple systems would thus require an attacker to compromise all the different systems along with the authentication service provider to expose a user's raw private key. DKMS can be further broadened to encrypt and decrypt any data in a decentralized way, i.e., it is not limited to just passwords.

Although DKMS improves data security through decentralization, the decentralization process could lead to data recovery issues due to the decentralized nature of the storage. For example, by utilizing a third-party key management system, when one or more of the third parties that store, encrypt, and/or decrypt the user's data (e.g., private keys, passwords, etc.) cease to provide their services (e.g. becomes insolvent), the user's data may become unretrievable. Moreover, an application could use an authentication service provider that may make changes to the security architecture resulting in obtaining user-sensitive data without the user's knowledge. Therefore, further improvements are needed to create a system fully capable of providing resilience and security for the user's data.

The subject matter of the present disclosure is directed to overcoming, or at least reducing the effects of, one or more of the problems set forth above. To address these and other issues, techniques are disclosed herein that enable new user data recovery features and additional security controls with improved DKMS, wherein users completely own their data (e.g., private keys)—and no single third-party entity has control over the user's data.

DETAILED DESCRIPTION

Figure 1:
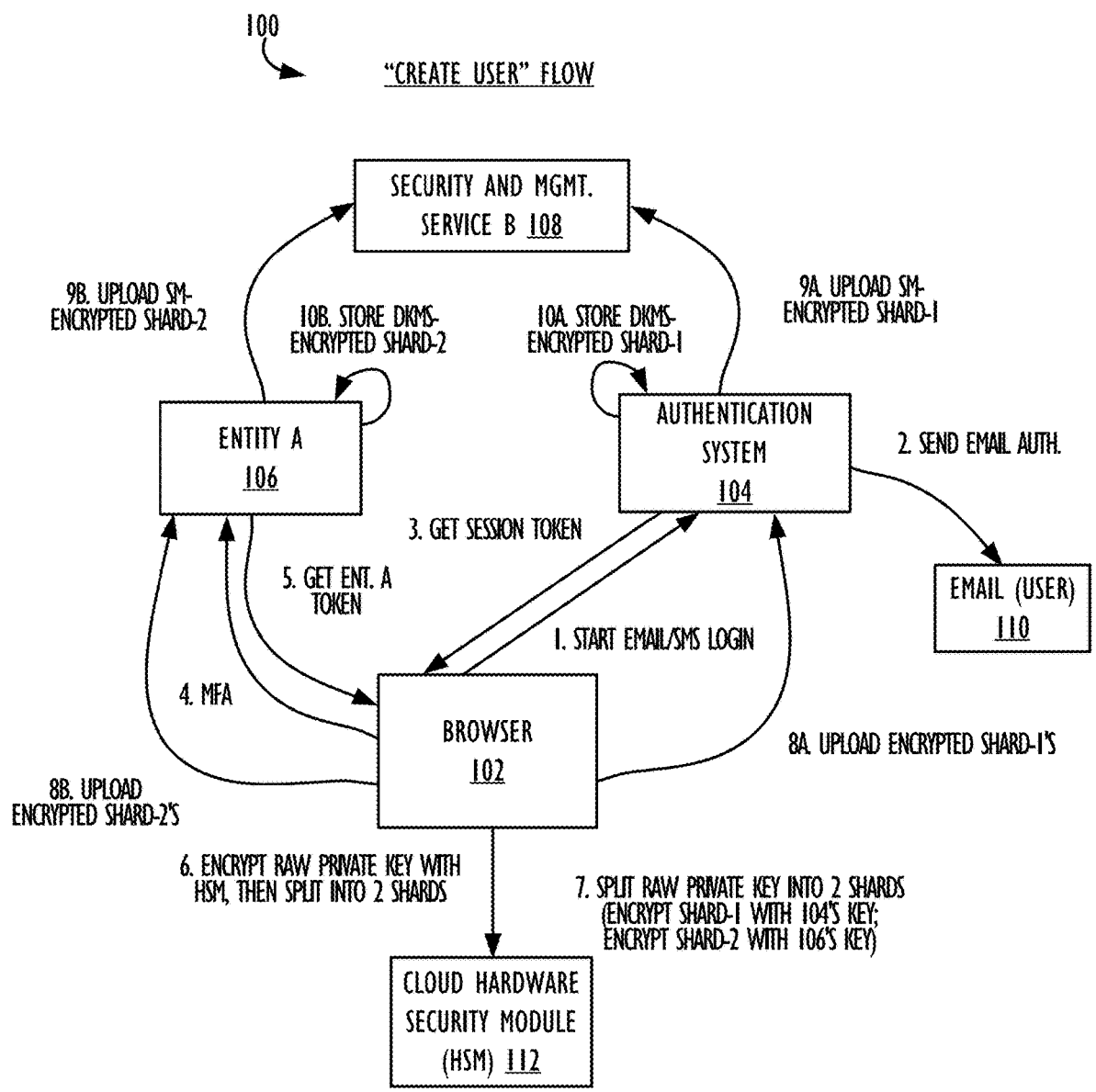
FIG. 1 is a block diagram illustrating an operation for creating a new user account for digital wallet transactions in a Web 3.0 context, according to one or more disclosed embodiments.

The data-splitting DKMS improves the current generation of DKMS by offering a user data recovery feature and additional security controls and procedures to ensure an authentication service provider's system does not gain access to a user's data. With the improved data-splitting DKMS, users completely own their data, such as private keys, and neither the authentication service provider—nor other third-party entities—have control over the user data.

In some implementations, two separate and independent entities, e.g., the authentication service provider and another entity, "Entity A," store separate data shards encrypted using a KMS and split from encrypted data (e.g., encrypted private keys). When the data shards from the authentication service provider and Entity A are reassembled and decrypted, an isolated and secure execution environment can reconstruct the original data (e.g., private keys). The isolated and secure execution environment is also inaccessible by a decentralized application (dApp). In one or more implementations, the isolated and secure execution environment could be an iFrame, which can also be generally referenced within this disclosure as a secure web sandbox.

Data shards are stored on two separate entities: the authentication service provider and Entity A. One or more Security and Management Services (e.g., a "Security and Management Service A") will monitor the authentication service provider and Entity A to ensure both are operational and in compliance based on pre-agreed-upon conditions (e.g., the authentication service provider and Entity A cannot obtain the user's whole data or shards sent to 3rd parties).

Security and Management Service A will be responsible for creating and storing two separate master decryption keys: one for the authentication service provider and the other for Entity A. Security and Management Service B will be responsible for storing the encrypted data shards from the authentication service provider and Entity A. If the Security and Management Services discover that either the authentication service provider or Entity A is not operational or complying with pre-agreed-upon conditions, Security and Management Service A will release the master decryption keys to Security and Management Service B. With the master decryption keys, Security and Management Service B will provide instructions to the end users on how to recover their data.

In other implementations, novel split private key generation techniques are disclosed, wherein a newly-generated private key may be split into at least three shards, e.g., an authentication service provider shard, a shard for another Entity system or service (e.g., the aforementioned "Entity A"), and a recovery shard. Recovery shard handling may involve one or more of the following options: 1) discarding the recovery shard; 2) sending the recovery shard to the user; or 3) placing the recovery shard in the custody of another entity. As may be appreciated, discarding the recovery shard according to option 1) above would help to prevent a single party, e.g., the authentication system, from having the ability to reconstruct the private key. In regard to options 2) and 3) above, with option 2), the end-user and the developer can work together to reconstruct the private key, and, with option 3), the developer and the entity can work together to reconstruct the private key.

In still other implementations, novel split private key reconstruction and transaction signing techniques are disclosed. In particular, an iFrame may be configured to decrypt separate shards of a private key using a KMS and then use the reconstructed private key to sign a digital transaction for submission to a blockchain or some other decentralized network (or perform another task, as desired, that requires the use of a private key in its entirety).

Figure 15:
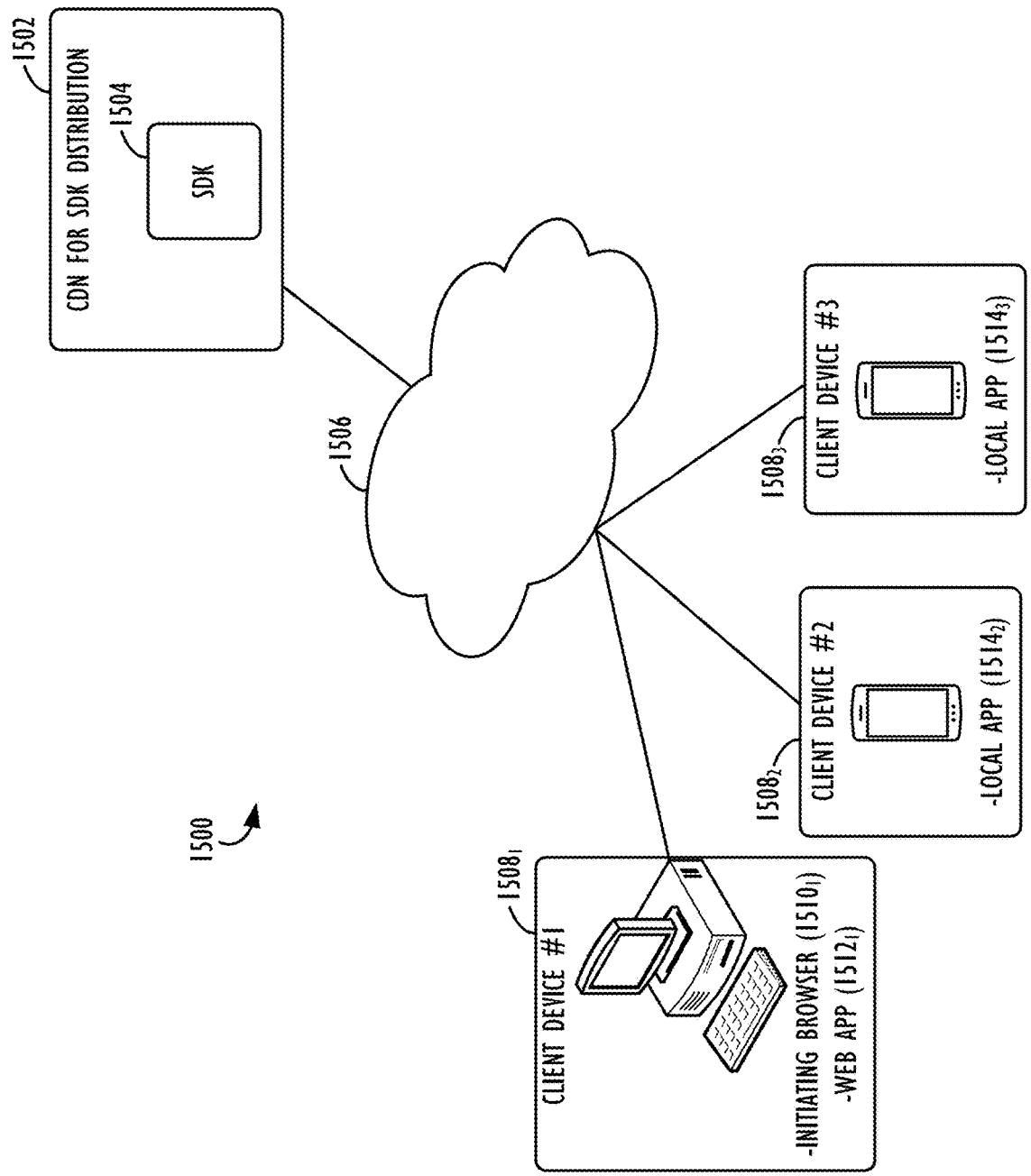
FIG. 15 is a block diagram illustrating a content distribution network (CDN) that is configured for software development kit (SDK) distribution, according to one or more disclosed embodiments.

It is to be understood that, in some implementations described herein, a content distribution network (CDN), packet manager, or the like, may be used that is configured for software development kit (SDK) distribution, e.g., the distribution of one or more SDK libraries 1504 to client devices $1508_1$-$1508_3$ (also referred to herein as simply "clients"). For example, as shown in FIG. 15, the download of the SDK library 1504 from an exemplary CDN 1502 may embed a framework that provides an interface for one or more decentralized applications (dApps) to initiate or cause the execution of the various wallet and/or DKMS functionalities that will be described herein. Specifically, the SDK library 1504 acts as an interface between the dApp with an isolated and secured execution environment, such as an iFrame or a device-specific secure enclave. In a Web 3.0 context, because the isolated and secured execution environment runs in a separate domain than the SDK library 1504 and the dApp, neither the dApp nor the SDK library 1504 has access to private keys generated in the isolated and secured execution environment.

In FIG. 15, a web application (or "Web App") 1512$_1$ (e.g., dApp) in an initiating browser 1510$_1$ of an exemplary client device, such as client device #1 (1508$_1$) may pull (i.e., download over a network, such as the Internet 1506) an SDK library 1504 from the CDN 1502. The Web App 1512$_1$ may then gather various information related to the user of the initiating browser 1510$_1$ (e.g., email address, telephone number, etc.) to use as a secure context identifier and communicate with the various systems and entities that play a role in the DKMS functionality. In other implementations, the SDK library 1504 could be downloaded and utilized within an application running locally on a mobile device, such as local application 1514$_2$ (e.g., dApp) running on exemplary client device #2 (1508$_2$) or local application 1514$_3$ (e.g., dApp) running on exemplary client device #3 (1508$_3$), and so forth. In the mobile device context, the local application 1514 (e.g., dApp) may execute a device-specific secure enclave to generate and/or split the private key, whereas, in the client browser context, the application may be executing in an isolated iFrame of the initiating browser 1510, as will be explained further below.

Referring now to FIG. 1, an operation 100 for creating a new user account for digital wallet transactions in a Web 3.0 context is shown, according to one or more disclosed embodiments. Although FIG. 1 generally discusses decrypting and encrypting private keys, the architecture shown can encrypt and decrypt other data types. As an example, FIG. 1 generally describes a use case in a Web 3.0 context; however, FIG. 1 can be applied to a variety of Web 2.0 use cases, such as securely storing healthcare data, credit card information, Personal Identifiable Information (PII), or any other private information. In such Web 2.0 use cases, given the lower risk when compared to a Web 3.0 wallet, FIG. 1 could be modified to avoid utilizing an Entity A and/or splitting the private key into multiple shards. The user will still own the relevant information, not the authentication service provider (e.g., authentication system 104). A user recovery flow may still exist by having a Security and Management Service and Key Escrow Provider to provide the user access to the raw private keys and/or other user data if the authentication service provider fails to stay operational.

In FIG. 1, the new user account creation processes may occur after the web browser and/or client device detects a sign-up event that includes a request to create a new user account. In a Web 3.0 context, the creation of a new user account could be linked to a new wallet or include the creation of wallet when the user signs into a dApp for the first time.

In step 1 of FIG. 1, the user signs into the user account for the first time by starting an email login process at a user web browser 102 and/or client device. At step 2, of FIG. 1, authentication system 104 sends an email authentication request to a third-party email system/service 110. The third-party email system/service 110 generates a time-bound or time-limited access token that gets sent back to authentication system 104. Authentication system 104 acts as an authentication service provider when a user logs into a user account for the dApp. Step 3 of FIG. 1 illustrates that authentication system 104 sends the time-bound or time-limited access token back to the user web browser 102 (e.g., iFrame) and/or client device. The time-bound or time-limited access token allows for the web browser and/or client device to bypass the authentication service provider and communicate with a KMS that includes cloud or remote hardware security modules. Authenticating a user account using the time-bound access token and scoped credentials with a KMS that includes a hardware security module (HSM) is discussed in more detail in the '321 patent, e.g., at FIG. 2A. Steps 4 and 5 involve securely establishing a session with Entity A 106 by using multi-factor authentication (MFA) with a pin, passkey, or biometric information. In one or more implementations, Entity A 106 may initially authenticate the web browser and/or client using a time-bound or time-limited access token. Once the initial authentication occurs, MFA or other authentication factors (biometrics, etc.) can be used to simplify and smooth out any user friction associated with authenticating a user.

Prior to step 6 in FIG. 1, according to one embodiment, the web browser and/or client device 102 generates a private key within an iFrame or some other isolated and secure execution environment. Recall that the dApp or SDK cannot access the iFrame to obtain the generated private key. In a wallet creation context, the private key can be a wallet key used to sign wallet transactions. In another embodiment, rather than the iFrame generating data (e.g., a private key) to encrypt, the iFrame can receive data from a third-party source, e.g., via the web browser, for encryption. As an example, the web browser could inject healthcare data, PII, or any other private user data sent into the iFrame for encryption.

At step 6 of FIG. 1, the private key generated by the iFrame or other private user data provided to the iFrame is sent over to the KMS (e.g., cloud hardware security module (HSM) 112) to encrypt and then split into two or more key or data shards. The key shards are then sent back to the web browser and/or client device 102 (specifically, the iFrame or some other secure execution environment).

At step 7, the iFrame in browser 102 (i.e., a secure execution environment) first splits the raw private key into two shards and encrypts each shard with a corresponding "entity, master encrypted key." As will described in greater detail below with reference to FIG. 2, according to some implementations, the iFrame may have a separate "entity, master encrypted key" for Entity A 106 and authentication system 104. Thus, instead of having a single "master encrypted key" used to generate a "master encrypted private key" (as shown in step 8 in FIG. 5), step 7 of FIG. 1 uses two separate "entity, master encrypted key" to generate two "master encrypted shards." The two "master encrypted shards" may also be referred to herein as SM-encrypted shard-1 and SM-encrypted shard-2 shown in FIG. 1. The SM-encrypted shard-1 is encrypted with the "entity, master encrypted key" provided by/corresponding with authentication system 104, and the SM-encrypted shard-2 is encrypted with the "entity, master encrypted key" provided by/corresponding with Entity A 106. The two "master encrypted shards" differ from the two key shards encrypted with the KMS at step 6. Specifically, the two "master encrypted shards" are used for private key recovery, while the key shards encrypted at step 6 are for signing digital transactions. FIG. 1 shows, at Steps 8A/8B, that the SM-encrypted shard-1 and SM-encrypted shard-2 are sent to Entity A 106 and authentication system 104, respectively. Afterwards, at Steps 9A/9B, Entity A 106 and authentication system 104 may proceed to send the respective shards to Security and Management Service B 108. At steps 10A/10B in FIG. 1, authentication system 104 stores the DKMS-encrypted shard-1, and Entity A 106 stores the DKMS-encrypted shard-2.

Figure 2:
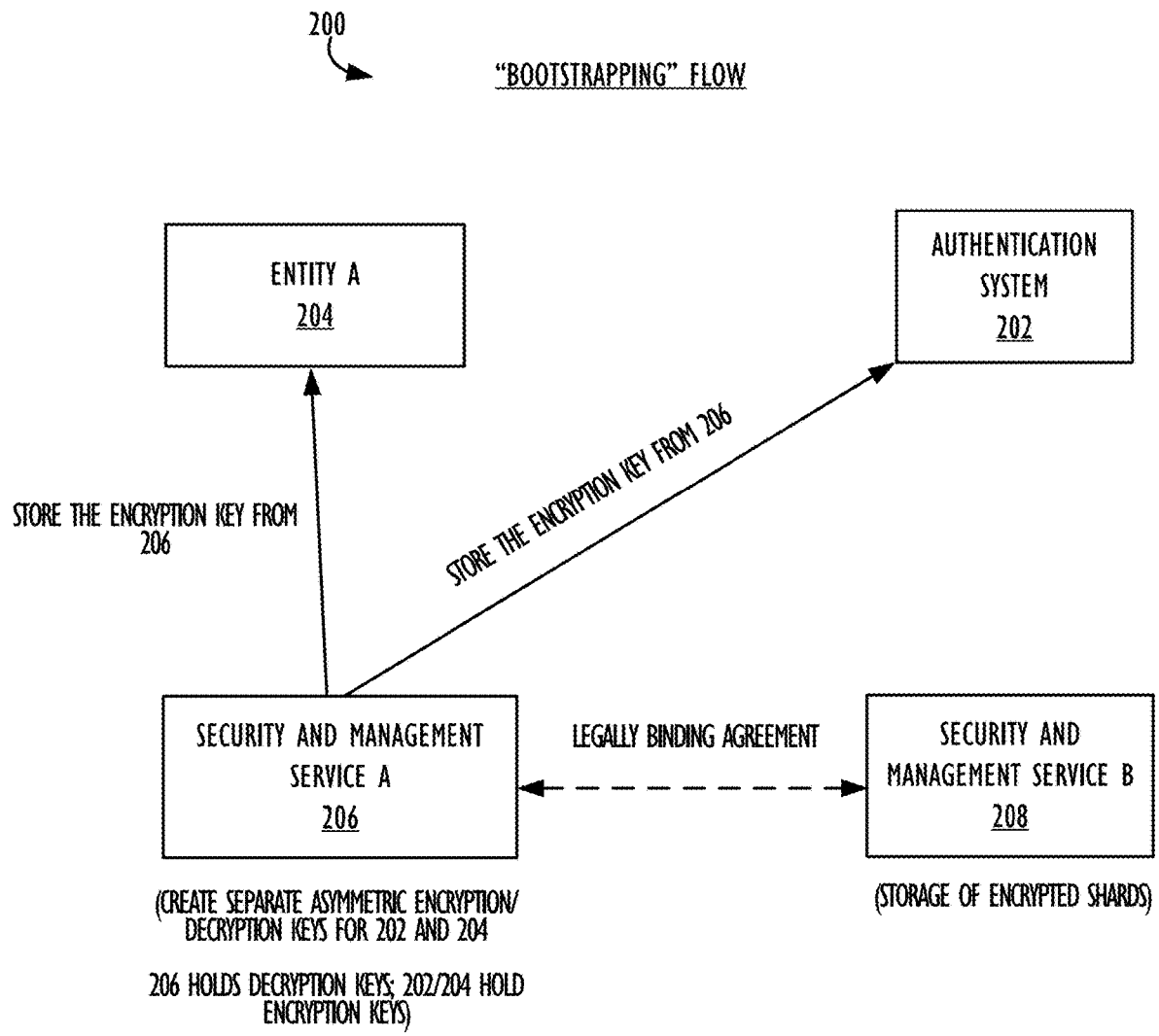
FIG. 2 is a block diagram illustrating a bootstrapping operation, wherein a Security and Management Service generates and holds master decryption keys, according to one or more disclosed embodiments.

Referring now to FIG. 2, a bootstrapping operation 200, wherein a Security and Management Service generates and holds master decryption keys, is shown, according to one or more disclosed embodiments. Because the exemplary operation of FIG. 2 does not illustrate a key escrow provider, Security and Management Service A 206 in FIG. 2 acts as both the Security and Management Service and the key escrow provider (whose role will be described in more detail, with reference to FIG. 7). In FIG. 2, Security and Management Service A 206 generates separate asymmetric encryption and decryption keys for each entity. As an example, Security and Management Service A 206 generates a first set of asymmetric encryption and decryption keys for authentication system 202 and a second set of asymmetric encryption and decryption keys for Entity A 204. Security and Management Service A 206 stores both sets of "master decryption keys" and provides the corresponding "entity, master encryption keys" to authentication system 202 and Entity A 204. FIG. 2 also illustrates that Security and Management Service A 206 and Security and Management Service B 208 are specially-configured to prevent collusion. Thus, Security and Management Service B 208 cannot obtain the "master decryption keys" from Security and Management Service A 206 unless Security and Management Service A 206 initiates a user key recovery process.

Figure 3:
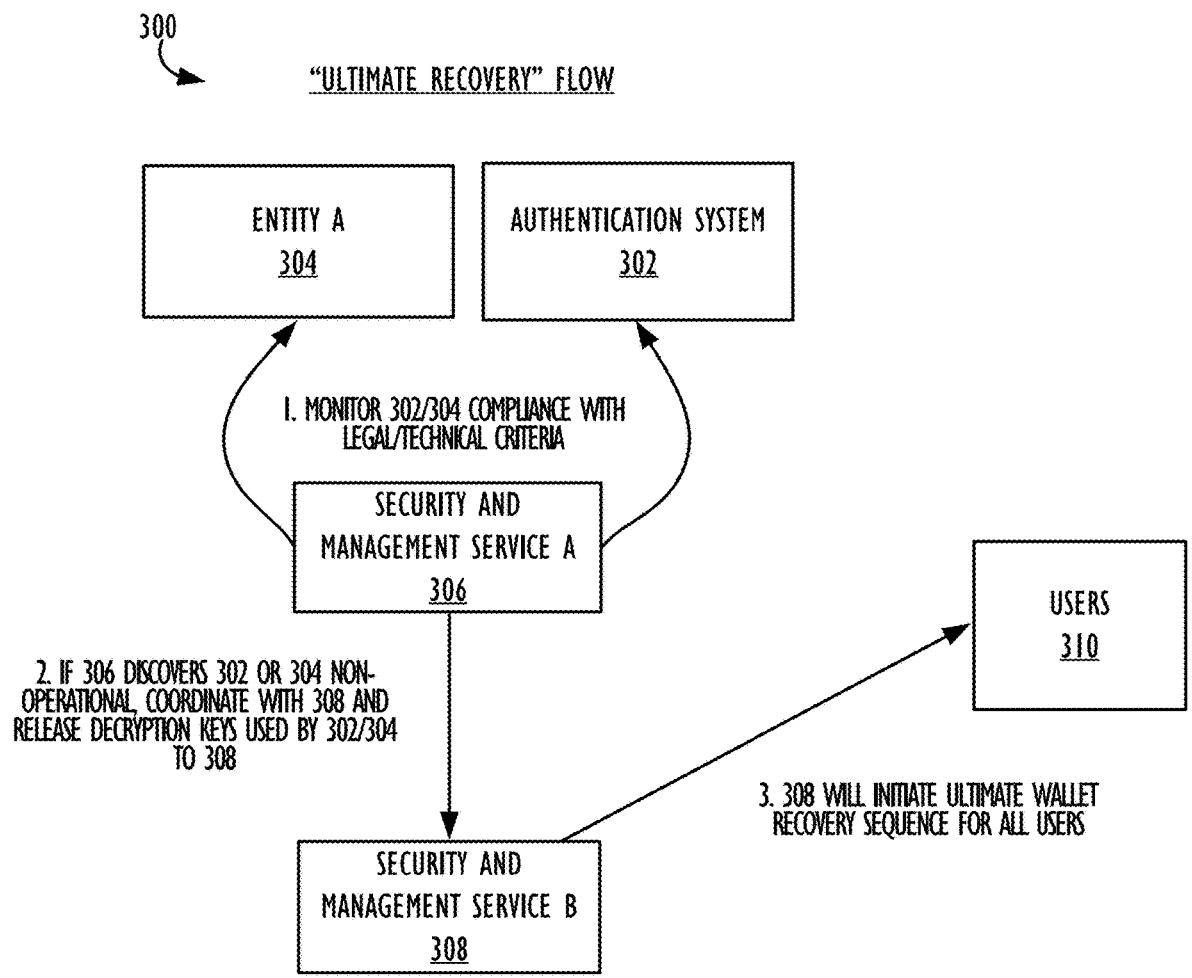
FIG. 3 is a block diagram illustrating a user key recovery operation that releases two sets of "master decryption keys" to a user to decrypt two "entity, master encrypted keys," according to one or more disclosed embodiments.

Referring now to FIG. 3, a user key recovery operation 300 that releases two sets of "master decryption keys" to a user to decrypt two "entity, master encrypted keys," is shown, according to one or more disclosed embodiments. As shown in FIG. 3, once Security and Management Service A 306 determines Entity A 304 and/or authentication system 302 has become non-operational (and/or no longer is in compliance with the legal and technical criteria for operations), Security and Management Service A 306 will coordinate with Security and Management Service B 308 to release the two sets of "master decryption keys" to Security and Management Service B 308. Security and Management Service B 308 will then initiate the ultimate wallet recovery sequence for all users 310.

Figure 4:
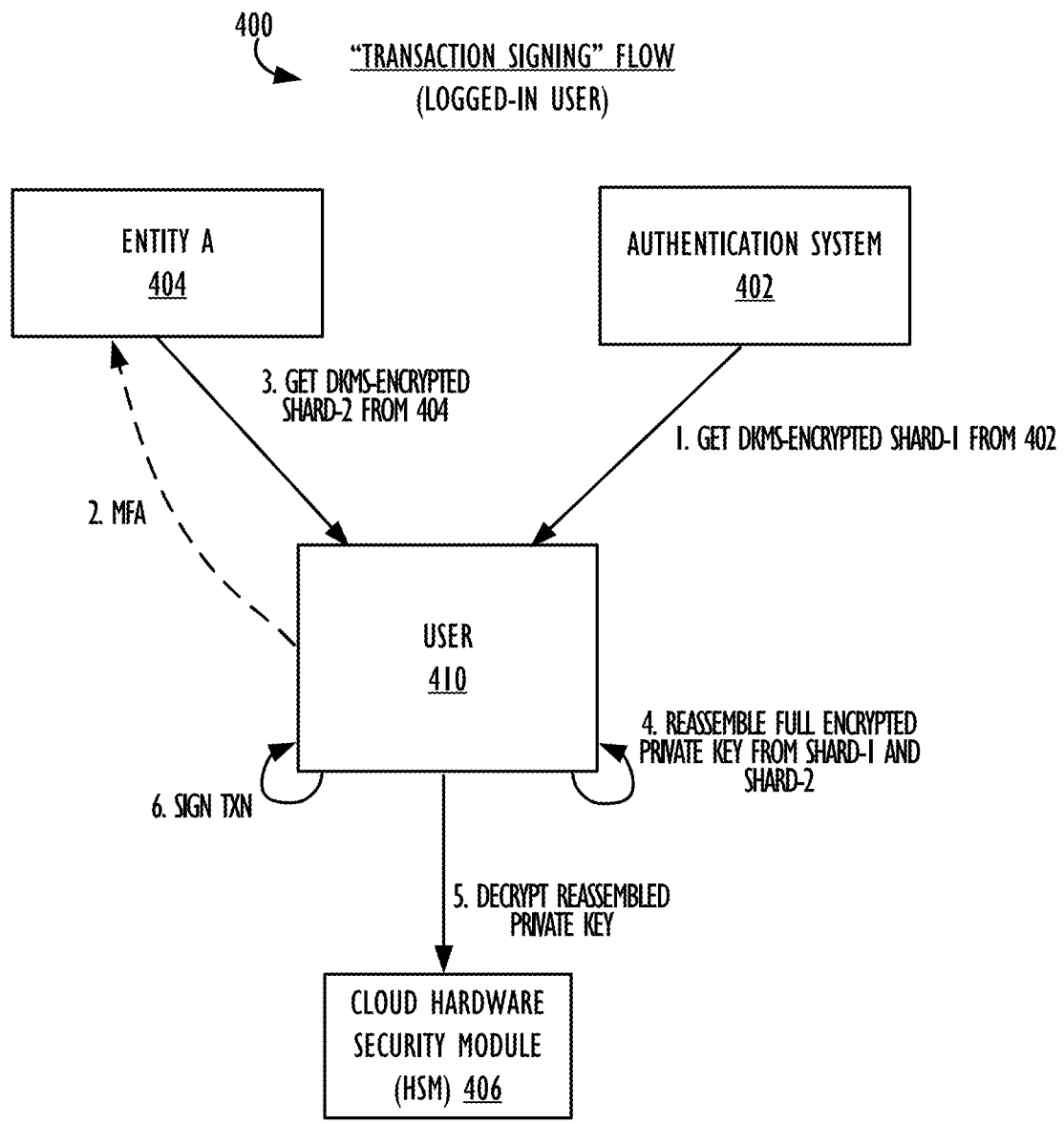
FIG. 4 is a block diagram illustrating a transaction signing operation for logged-in users, according to one or more disclosed embodiments.

Referring now to FIG. 4, a transaction signing operation 400 for logged-in users (e.g., users of a Web 3.0 wallet) is shown, according to one or more disclosed embodiments. After a user 410 is authenticated by an authentication system 402 (e.g., as described in more detail in the '321 patent, e.g., at FIG. 2A), authentication system 402 may provide a DKMS-encrypted shard-1 key to the user 410's browser (e.g., iFrame). At steps 2 and 3 of FIG. 4, the iFrame/web browser of user 410 authenticates the user for Entity A 404 using MFA. Once the user 410 is authenticated by Entity A 404, Entity A 404 provides a DKMS-encrypted shard-2 to the iFrame/web browser of user 410. The iFrame/web browser of user 410 then reassembles the fully encrypted private key from shard-1 and shard-2 at Step 4 and sends the reassembled encrypted private key to the Cloud HSM 406 for decryption at Step 5. Once the Cloud HSM 406 provides the decrypted private key to the iFrame/web browser of user 410, the iFrame/web browser may sign the transaction data at step 6. In a Web 3.0 context, the iFrame may submit the signed transaction to a blockchain or some other decentralized network. Although FIG. 4 illustrates that the reassembling of the private key and signing operations are done within the iFrame/web browser, other implementations could utilize one or more other isolated and secure execution environments to perform the reassembling and/or signing operations.

Figure 5:
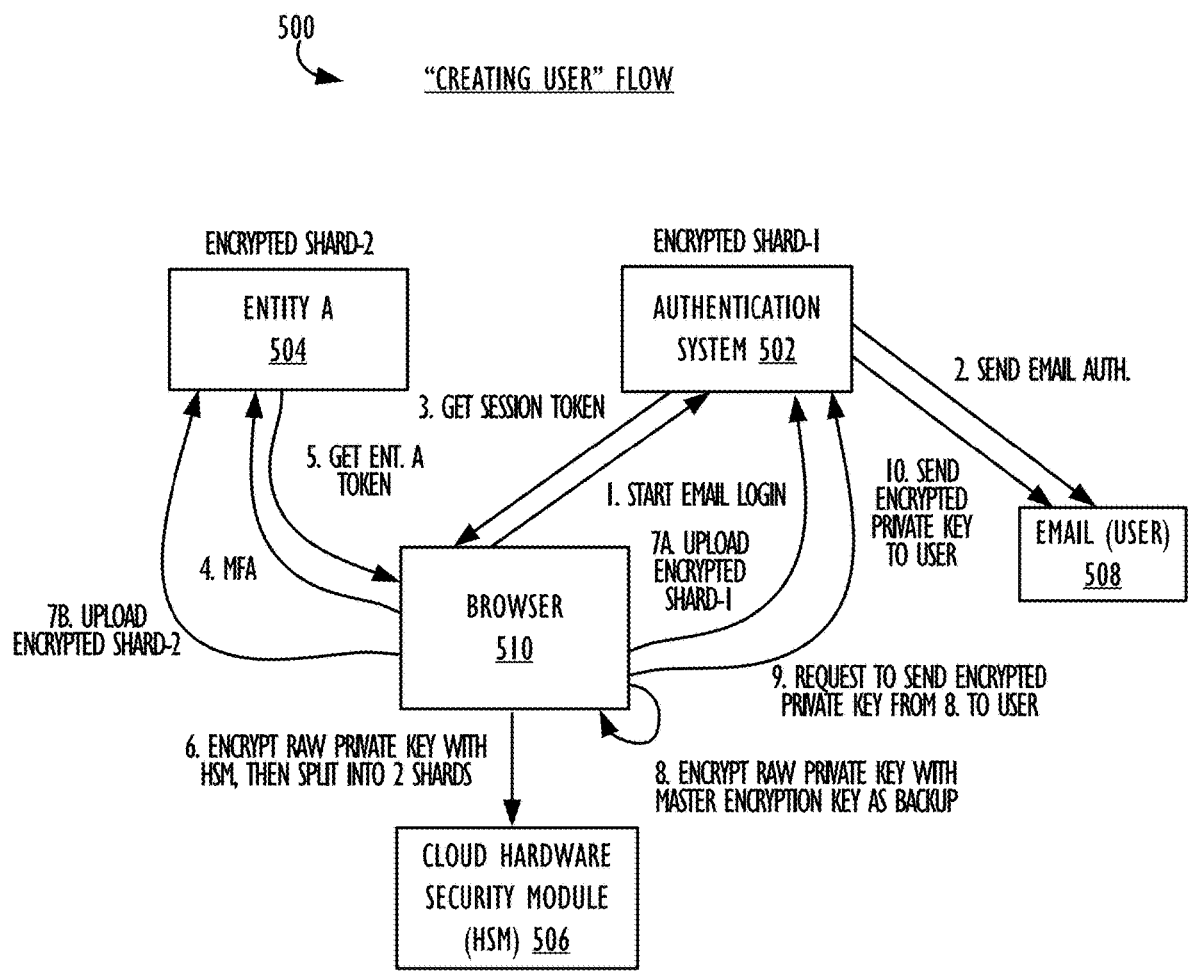
FIG. 5 is a block diagram illustrating a operation for creating a new user account for digital wallet transactions in a Web 3.0 context, according to one or more disclosed embodiments.

Referring now to FIG. 5, an operation 500 for creating a new user account for digital wallet transactions in a Web 3.0 context is shown, according to one or more disclosed embodiments. In FIG. 5, the new user account creation processes may occur after the web browser and/or client device 500 detects a sign-up event that includes a request to create a new user account. In a Web 3.0 context, the creation of a new user account could be linked to a new wallet or include the creation of wallet when the user signs into a dApp application for the first time.

In step 1 of FIG. 5, the user signs into the user account for the first time by starting an email login process at a user web browser 510 (e.g., iFrame) and/or client device. At step 2, of FIG. 5, an authentication system 502 sends an email authentication request to a third-party email system/service 508. The third-party email system/service 508 generates a time-bound or time-limited access token that gets sent back to authentication system 502. Step 3 of FIG. 5 illustrates that authentication system 502 sends the time-bound or time-limited access token back to the web browser 510 (e.g., iFrame) and/or client device. The time-bound or time-limited access token allows for the web browser and/or client device to communicate with a third-party KMS that includes cloud or remote hardware security modules. Steps 4 and 5 involve securely establishing a session with Entity A system 504 by using MFA, e.g., with a pin, passkey, or biometric information. In one or more implementations, Entity A 504 may initially authenticate the web browser and/or client 510 using a time-bound or time-limited access token. Once the initial authentication occurs, MFA or other authentication factors (biometrics, etc.) can be used to simplify and smooth out any user friction associated with authenticating a user.

Prior to step 6 in FIG. 5, in one embodiment, the web browser and/or client device 510 generates a private key in the iFrame. In a wallet creation context, the private key can be a wallet key used to sign wallet transactions for submission to a blockchain or some other decentralized network. In another embodiment, rather than the iFrame generating data (e.g., a private key) to encrypt, the iFrame can receive data from a third-party source, e.g., via the web browser, for encryption. As an example, the web browser could inject healthcare data, PII, or any other private user data sent into the iFrame for encryption.

At step 6, the private key (e.g., generated by the iFrame or other private user data provided to the iFrame) is sent over to the KMS (e.g., cloud HSM 506) to encrypt and then split into two or more key or data shards. The encrypted key shards are then sent back to the web browser and/or client device 510 (specifically, the iFrame or some other isolated and secure execution environment). In implementations where the KMS does not include functionality to split a private key, the private key can first be split in the iFrame of the web browser and/or client device 510, and the two keys or data shards are subsequently sent to the KMS (e.g., cloud HSM 506) for encryption.

At steps 7a and 7b, the web browser and/or client device 510 sends one of the shards to authentication system 502 and one of the shards to Entity A 504. In FIG. 5, authentication system 502 stores shard-1, while Entity A 504 stores shard-2. Thus, neither authentication system 502 or Entity A 504 includes the entire or whole encrypted key or performs any of the encryption. Key splitting offers an additional layer of security when compared to storing the entire encrypted key in a single system. Moreover, splitting the private key or private user data after encryption provides improved security, since the system only shares and distributes the encrypted key or data shards—thereby avoiding and limiting the exposure of the raw private key or private user data. As a result, encrypting and splitting the private key or private user data may be far more secure than first splitting the key while the private key or private user data is raw and then subsequently encrypting the different shards. Although the disclosure uses the term "shard" to describe splitting of the key, the term "share" could be interchanged with "shard."

Although not shown FIG. 5, authentication system 502 may send the "master encrypted key" to the web browser and/or client device 510 as part of the authentication flow. Step 8 in FIG. 5 shows that, after the web browser and/or client device 510 generates the private key, the web browser and/or client device 510 encrypts the raw or unencrypted private key with a "master encryption key" to generate a "master encrypted private key" as the backup. To recover the user's private key at a later date, e.g., when Entity A 504 and/or authentication system 502 is no longer operational, the user will use the "master encrypted private key" and the "master decryption key" to decode and regenerate the raw or unencrypted private key (as will be described in greater detail with reference to FIG. 6). The "master encrypted private key" is not used for any other transactions/processes except for private key recovery. In one or more embodiments, a Security and Management service, a Key Escrow Provider, or some other secure, third-party entity can also be used to generate the "master encryption key."

Figure 7:
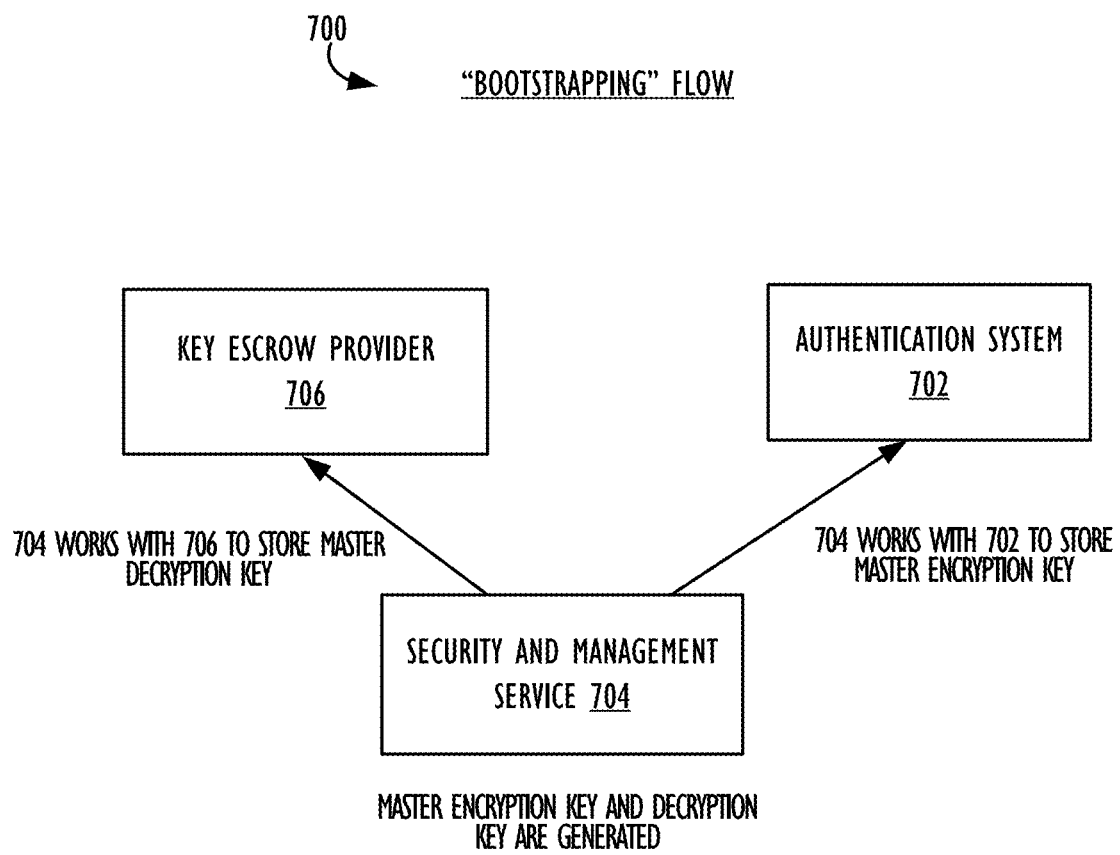
FIG. 7 is a block diagram illustrating a bootstrapping operation, wherein a Security and Management Service generates and holds master encryption and decryption keys, according to one or more disclosed embodiments.

After generating the "master encrypted private key," it may be sent to authentication system 502 for storage (see FIG. 7 for more details). Step 9 of FIG. 5 shows that the "master encrypted private key" is then sent to authentication system 502 for storage. At step 10 in FIG. 5, authentication system 502 then sends the "master encrypted private key" to a third-party email system/service 508 to send to a user for key recovery at a later date. Generally, the "master encrypted private key" can be stored by authentication system 502 and distributed to the user and any other entities given the limited access to the "master decryption key." Decrypting the "master encrypted private key" is nearly impossible without the "master decrypted key."

Figure 6:
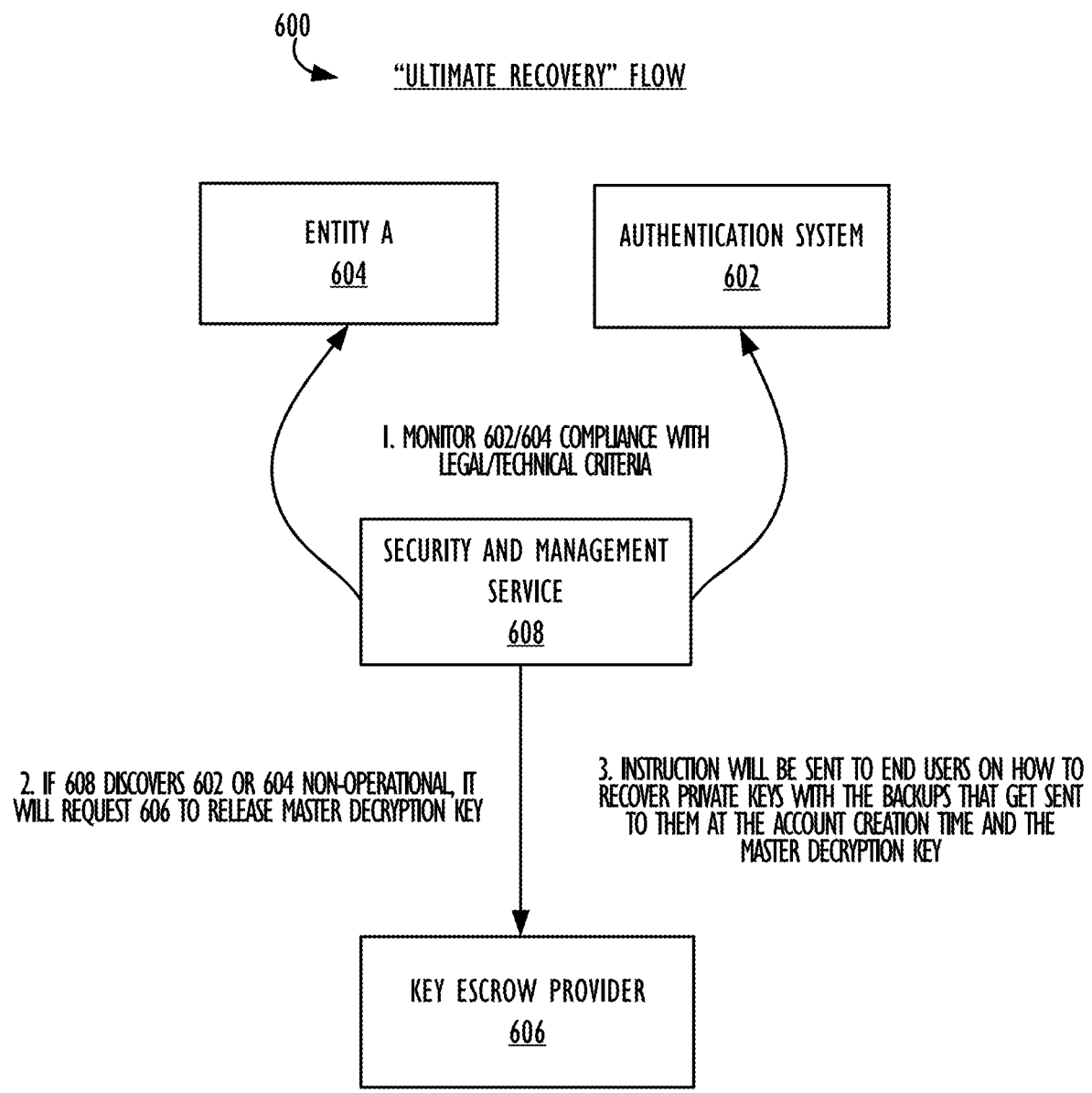
FIG. 6 is a block diagram illustrating a user key recovery operation wherein the "master decryption key" is released to the user to decrypt the "master encrypted private key," according to one or more disclosed embodiments.

Referring now to FIG. 6, a user key recovery operation 600, wherein the "master decryption key" is released to the user to decrypt the "master encrypted private key," is shown, according to one or more disclosed embodiments. FIG. 6 illustrates that there is a Security and Management Service 608 that monitors Entity A 604 and authentication system 602 for legal compliance and technical compliance. Specifically, the Security and Management Service 608 in FIG. 6 provides the special configuration between the Security and Management Service 608, Entity A 604, authentication system 602, and a Key Escrow Provider 606 to prevent collusion.

Neither authentication system 602 nor Entity A 604 knows who the Key Escrow Provider 606 is, and, instead, only the Security and Management Service 608 knows who the Key Escrow Provider 606 is. The Security and Management Service 608 is to check that both Entity A 604 and authentication system 602 are still operational, i.e., perform a "proof of life" check. To check whether the separate entities are still operational, the Security and Management Service 608 may perform checks on the legal and technical side. As a result, the Security and Management Service 608 is a system that needs to provide 24/7 monitoring of the business and technical operations of systems 602/604, based on the pre-agreed-upon legal and technical criteria. The Security and Management Service 608 would have an infrastructure and services to notify Key Escrow Provider 606 to release the "master decryption key" once Entity A 604 or authentication system 602 was not operational.

In FIG. 6, a Key Escrow Provider 606 would be an entity that has been specially-configured by the Security and Management Service 608 to prevent collusion. The Key Escrow Provider 606 would have no ties to Entity A 604 or authentication system 602. The Key Escrow Provider 606 would be a system to manage the "master decryption key" securely, e.g., by utilizing strong security controls and procedures to keep the master decryption key safe. Storage needs to be air-gapped, disconnected from the network, and would require 24/7 surveillance. The Key Escrow Provider 606 would have an infrastructure and services to receive notifications from the Security and Management Service 608 and release the "master decryption keys" to one or more designated or trusted systems.

When the Security and Management Service 608 discovers that either Entity A 604 or authentication system 602 is no longer operational, it will request the Key Escrow Provider 606 to release the master decryption key. When the Security and Management Service 608 provides instructions to the Key Escrow Provider 606 to release the master decryption key, the Key Escrow Provider 606 provides instructions to the end-user on how to recover their private keys with the master encryption key that was sent to them at the account creation time. For example, the Security and Management Service 608 can post the "master decryption keys" to GitHub or within a mobile application, so that users can follow instructions to recover the user's raw private key.

Referring now to FIG. 7, a bootstrapping operation 700, wherein a Security and Management Service 704 generates and holds master encryption and decryption keys, is shown, according to one or more disclosed embodiments. In FIG. 7, the Security and Management Service 704 generates both keys and sends the master decryption key to the Key Escrow Provider 706 for storage. The "master encryption key" is sent to authentication system 702 for storage. In one or more embodiments, rather than the Security and Management Service 704 generating the "master encryption key" and the "master decryption key," the Key Escrow Provider 706 could generate the "master encryption key" and the "master decryption key." The Key Escrow Provider 706 would store the "master decryption key" and send the "master encryption key" to the Security and Management Service 704 for distribution to authentication system 702 for storage. By having the Key Escrow Provider system 706 directly generate and store the "master decryption key," the "master decryption key" would never leave the Key Escrow Provider system 706, thereby reducing the number of entities that have (or that ever had) access to the "master decryption key."

Figure 8:
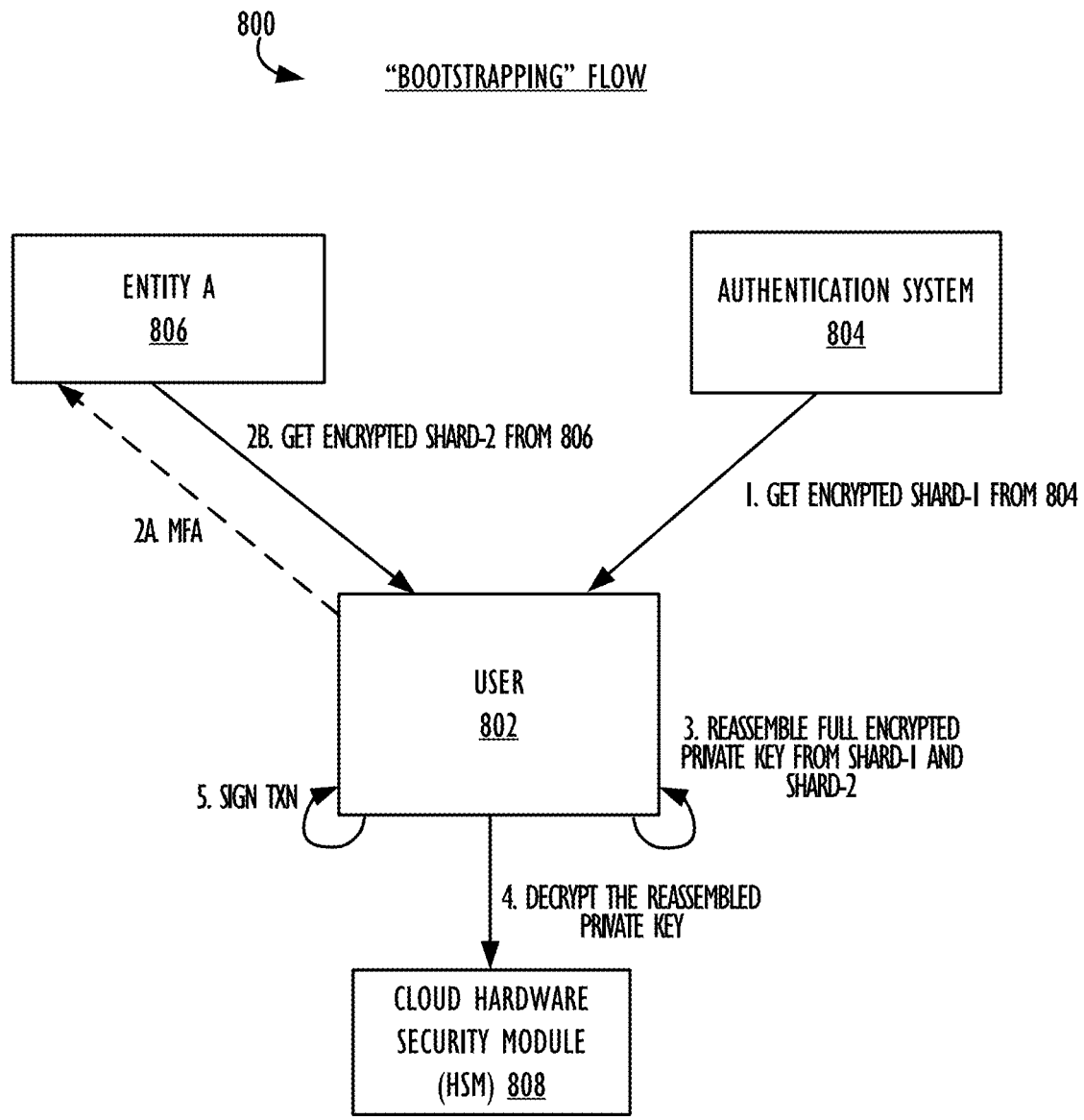
FIG. 8 is a block diagram illustrating a transaction signing operation for logged-in users, according to one or more disclosed embodiments.

Referring now to FIG. 8, a transaction signing operation 800 for logged-in users (e.g., users of a Web 3.0 wallet) is shown, according to one or more disclosed embodiments. After a user 802 is authenticated by an authentication system 804 (e.g., as described in more detail in the '321 patent, e.g., at FIG. 2A), authentication system 804 may provide encrypted Shard-1 key to the user 802's browser (e.g., iFrame). At steps 2a and 2b of FIG. 8, the iFrame/web browser of user 802 authenticates the user for Entity A 806 using MFA. Once the user 802 is authenticated by Entity A 806, Entity A 806 provides an encrypted shard-2 to the iFrame/web browser of user 802. The iFrame/web browser of user 802 then reassembles the fully encrypted private key from shard-1 and shard-2 at Step 3 and sends the reassembled encrypted private key to the Cloud HSM 808 for decryption at Step 4. Once the Cloud HSM 808 provides the decrypted private key to the iFrame/web browser of user 802, the iFrame may sign the transaction data at step 5. In a Web 3.0 context, the iFrame/web browser may submit the signed transaction to a blockchain or some other decentralized network. Although FIG. 8 illustrates that the reassembling of the private key and signing operations are done within the iFrame/web browser, other implementations could utilize one or more other isolated and secure execution environments to perform the reassembling and/or signing operations. In embodiments where the iFrame receives the private user data from a third party, the signing flow could differ. For example, after decrypting the private user data in step 4 of FIG. 8, the private user data can be sent to a third-party system for use. The iFrame would then not perform step 5 of FIG. 8 to sign a transaction.

Figure 9:
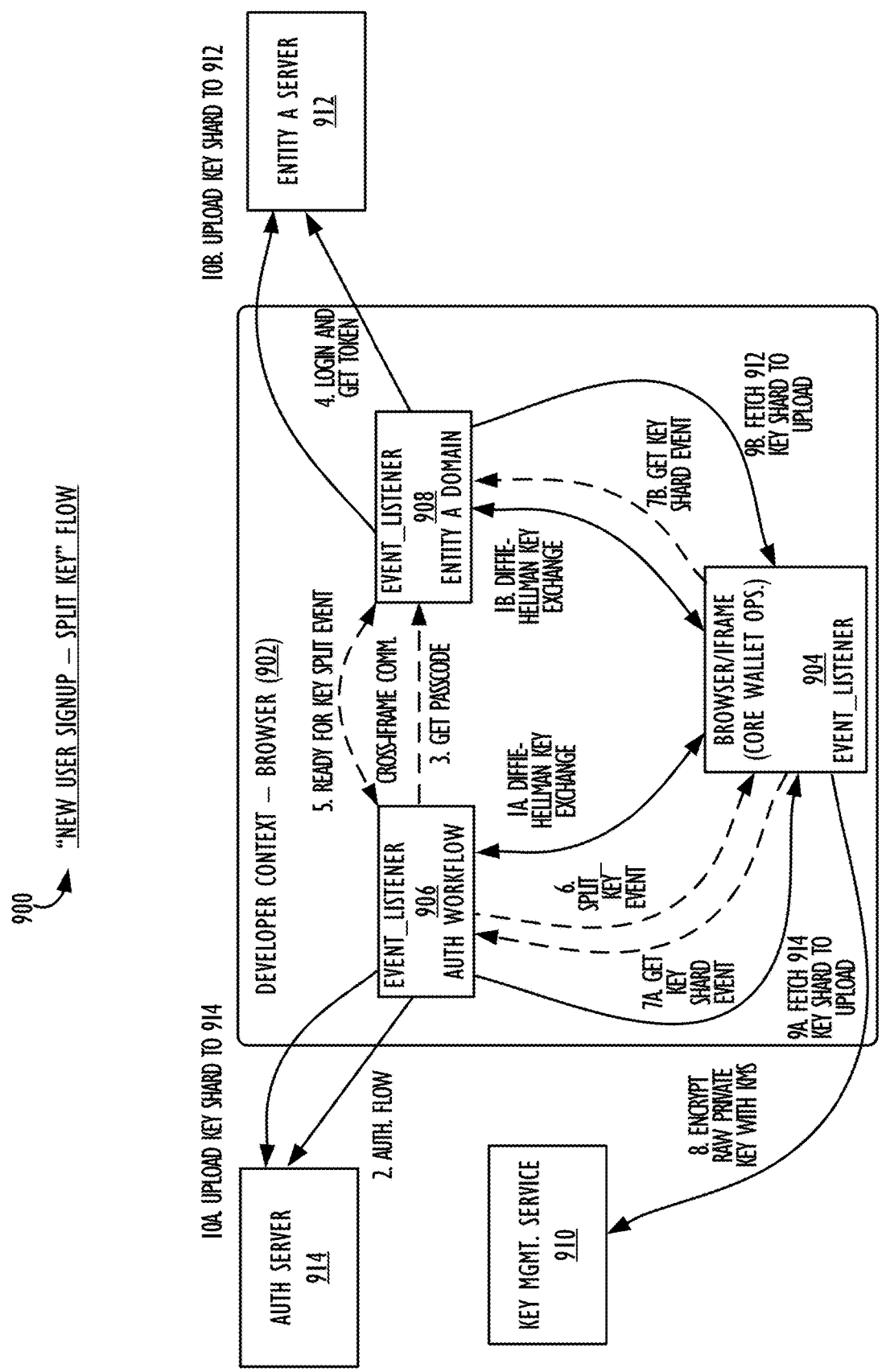
FIG. 9 is a block diagram illustrating a key splitting process for a new user sign up operation, according to one or more disclosed embodiments.

Referring now to FIG. 9, a key splitting process for a new user sign up operation 900 is shown, according to one or more disclosed embodiments. A browser (e.g., iFrame 904) operating within a developer context 902 may provide core wallet operations for a user, e.g., the splitting and/or reconstruction of keys, the encryption and/or decryption of keys or other types of data, the signing of information or other transactional data, etc., and it may comprise an event listener for the domain of a KMS 910.

At step 1a of FIG. 9, the browser 904 may perform a Diffie-Hellman key exchange with an authentication operation (e.g., also operating in an iFrame 906 and comprising an event listener). At step 1b of FIG. 9, the browser 904 may also perform a Diffie-Hellman key exchange with an Entity A (e.g., also operating in an iFrame 908 and comprising an event listener). At step 2 of FIG. 9, an authentication server 914 operating on the same domain as iFrame 906 may be used to perform an authentication operation, e.g., providing a user session token to the user, etc. At step 3 of FIG. 9, iFrame 906 may use cross-iFrame communication to raise a get_passcode_event to Entity A iFrame 908, which may, e.g., pop the passcode screen and/or handle session tokens for the user. At step 4 of FIG. 9, Entity A iFrame 908 may perform a login operation and obtain a session token from an Entity A server 912. At step 5 of FIG. 9, Entity A iFrame 908 may indicate its readiness for a key split event by raising a ready_for_key_split_event that is received by the event listener of iFrame 906. In response, at step 6 of FIG. 9, iFrame 906 may raise a generate_split_key_event to iFrame 904. In response to this, at steps 7a and 7b of FIG. 9, the iFrame 904 may raise a get_your_key_shard_event to iFrames 906 and 908, respectively. At step 8 of FIG. 9, the iFrame 904 may also encrypt the raw private key with KMS 910.

At step 9a of FIG. 9, iFrame 906 may fetch its key shard to upload to iFrame 904, while, at step 9b of FIG. 9, iFrame 908 may fetch Entity A's key shard to upload to iFrame 904. Finally, at step 10a of FIG. 9, iFrame 906 may upload its key shard to upload to authentication server 914, while, at step 10b of FIG. 9, iFrame 908 may upload Entity A's key shard to the Entity A server 912.

Figure 10:
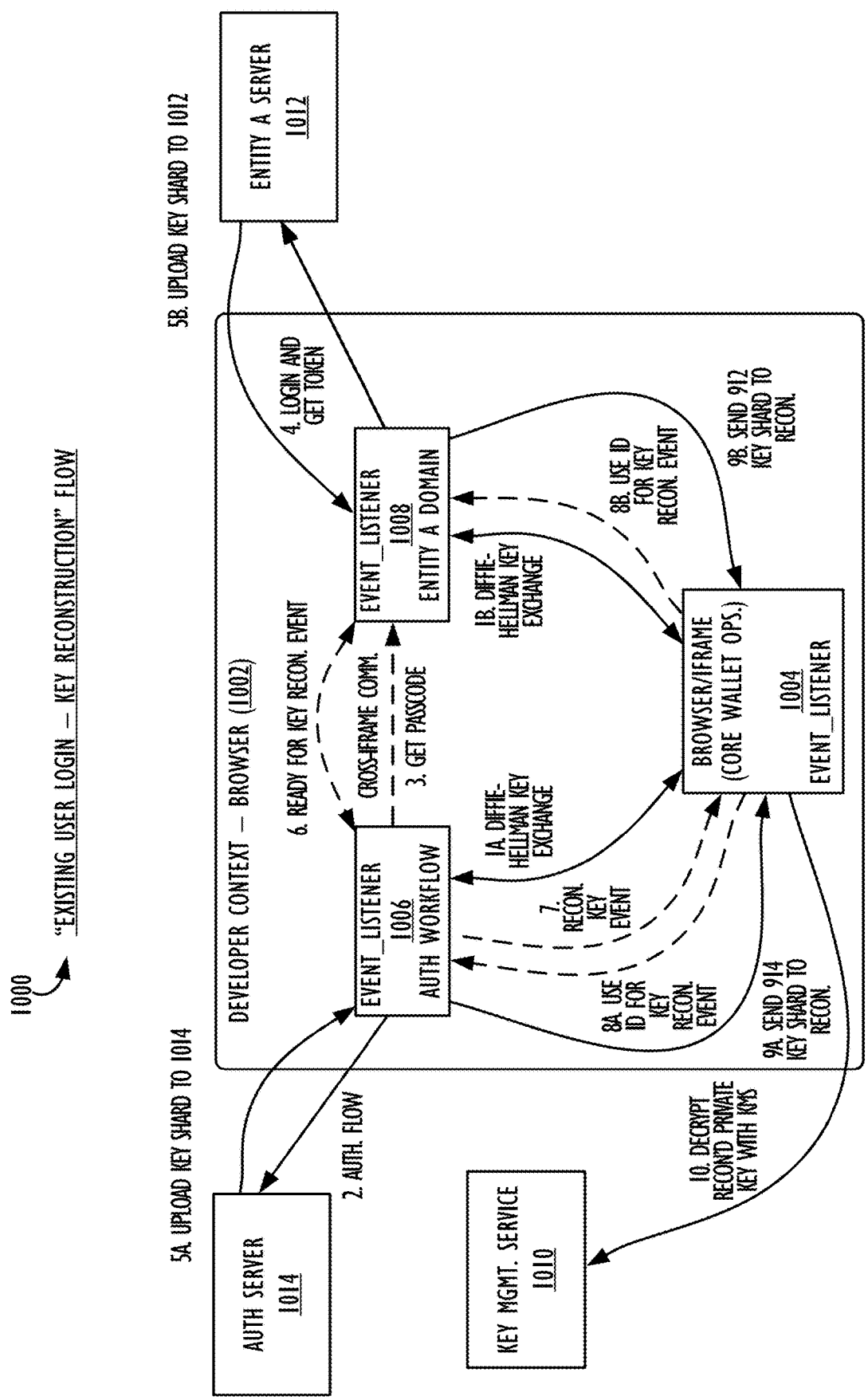
FIG. 10 is a block diagram illustrating a key reconstruction process for an existing user login operation, according to one or more disclosed embodiments.

Referring now to FIG. 10, a key reconstruction process for an existing user login operation 1000 is shown, according to one or more disclosed embodiments. A browser (e.g., iFrame 1004) operating within a developer context 1002 may provide core wallet operations for a user, e.g., the splitting and/or reconstruction of keys, the encryption and/or decryption of keys or other types of data, the signing of information or other transactional data, etc., and it may comprise an event listener for the domain of a KMS 1010.

At step 1a of FIG. 10, the browser 1004 may perform a Diffie-Hellman key exchange with an authentication operation (e.g., also operating in an iFrame 1006 and comprising an event listener). At step 1b of FIG. 10, the browser 1004 may also perform a Diffie-Hellman key exchange with an Entity A (e.g., also operating in an iFrame 1008 and comprising an event listener). At step 2 of FIG. 10, an authentication server 1014 operating on the same domain as iFrame 1006 may be used to perform an authentication operation, e.g., providing a user session token to the user, etc. At step 3 of FIG. 10, iFrame 1006 may use cross-iFrame communication to raise a get_passcode_event to Entity A iFrame 1008, which may, e.g., pop the passcode screen and/or handle session tokens for the user. At step 4 of FIG. 10, Entity A iFrame 1008 may perform a login operation and obtain a session token from an Entity A server 1012. At step 5a of FIG. 10, iFrame 1006 may upload the key shard to the authentication server 1014 (as may be required during a transaction signing), while, at step 5b of FIG. 10, iFrame 1008 may upload the key shard to the Entity A server 1012 (as may be required during a transaction signing).

At step 6 of FIG. 10, Entity A iFrame 1008 may indicate its readiness for a key merger event by raising a ready_for_key_merge_event that is received by the event listener of iFrame 1006. In response, at step 7 of FIG. 10, iFrame 1006 may raise a generate_merge_key_event to iFrame 1004. In response to this, at steps 8a and 8b of FIG. 10, the iFrame 1004 may raise a use_id_for_key_merge_event to iFrames 1006 and 1008, respectively.

At step 9a of FIG. 10, iFrame 1006 may send its key shard to iFrame 1004 for use in the merger, while, at step 9b of FIG. 10, iFrame 1008 may send Entity A's key shard to iFrame 1004 for use in the merger. Finally, at step 10 of FIG. 10, the iFrame 1004 may also send the decrypted merged private key for storage with KMS 1010.

Figure 11A:
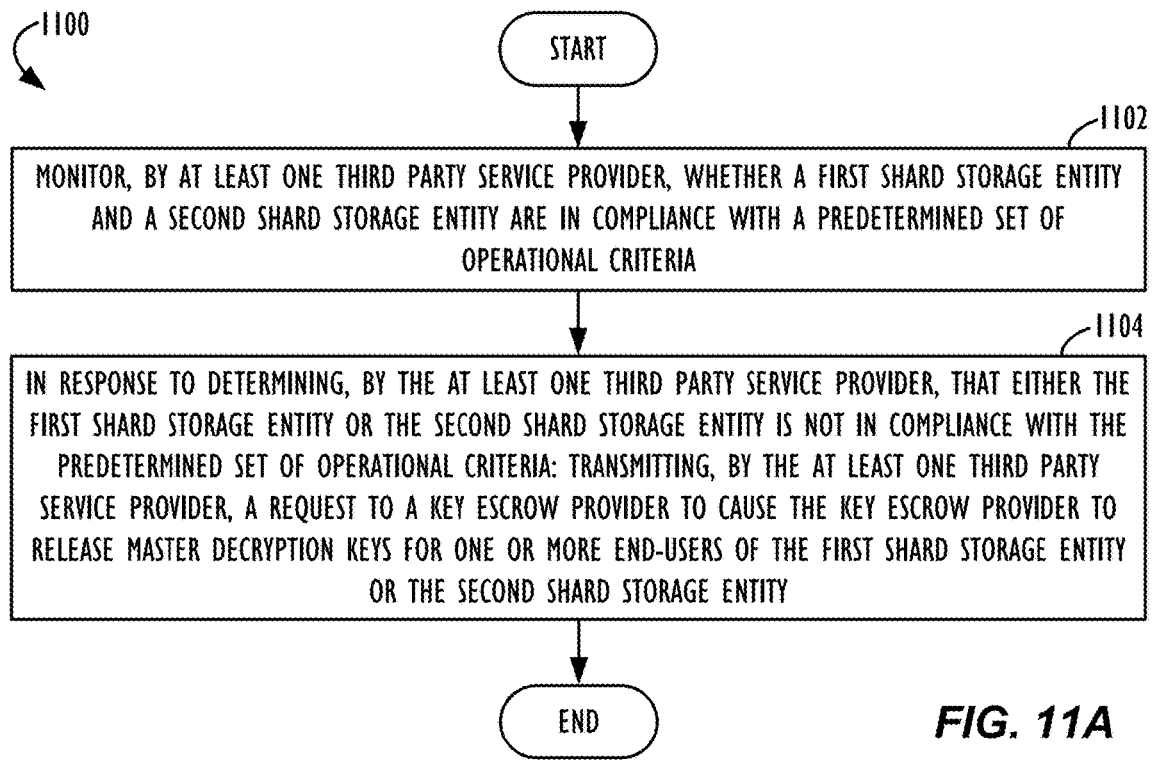
FIGS. 11A-11C are flowcharts illustrating exemplary methods for performing the various operations described herein, according to one or more disclosed embodiments.
Figure 11B:
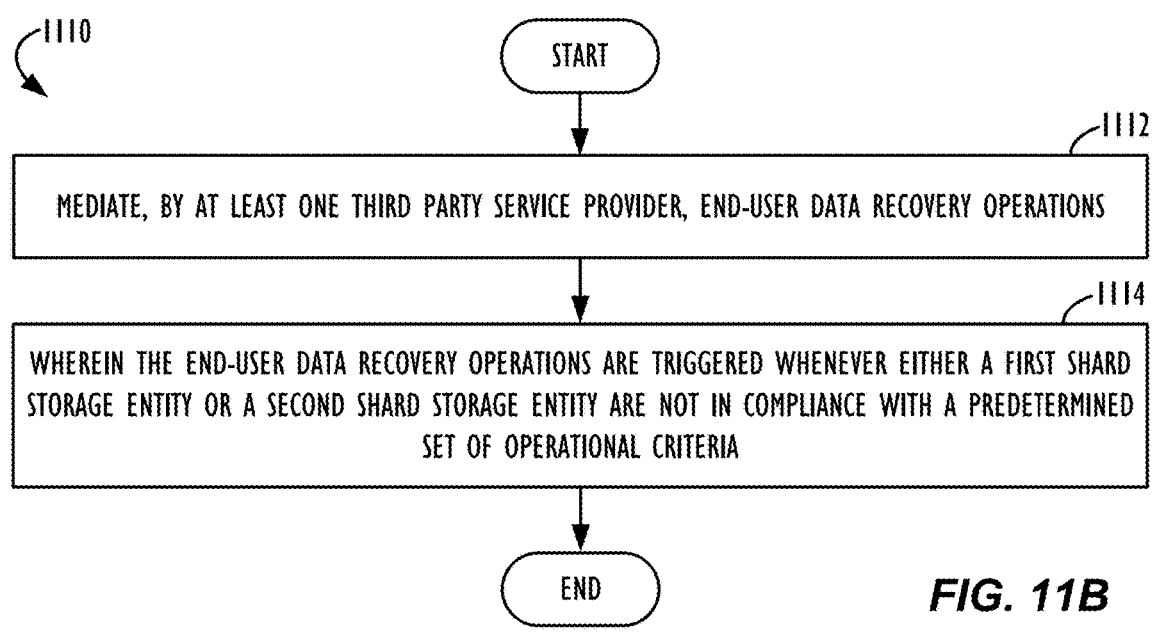
Figure 11C:
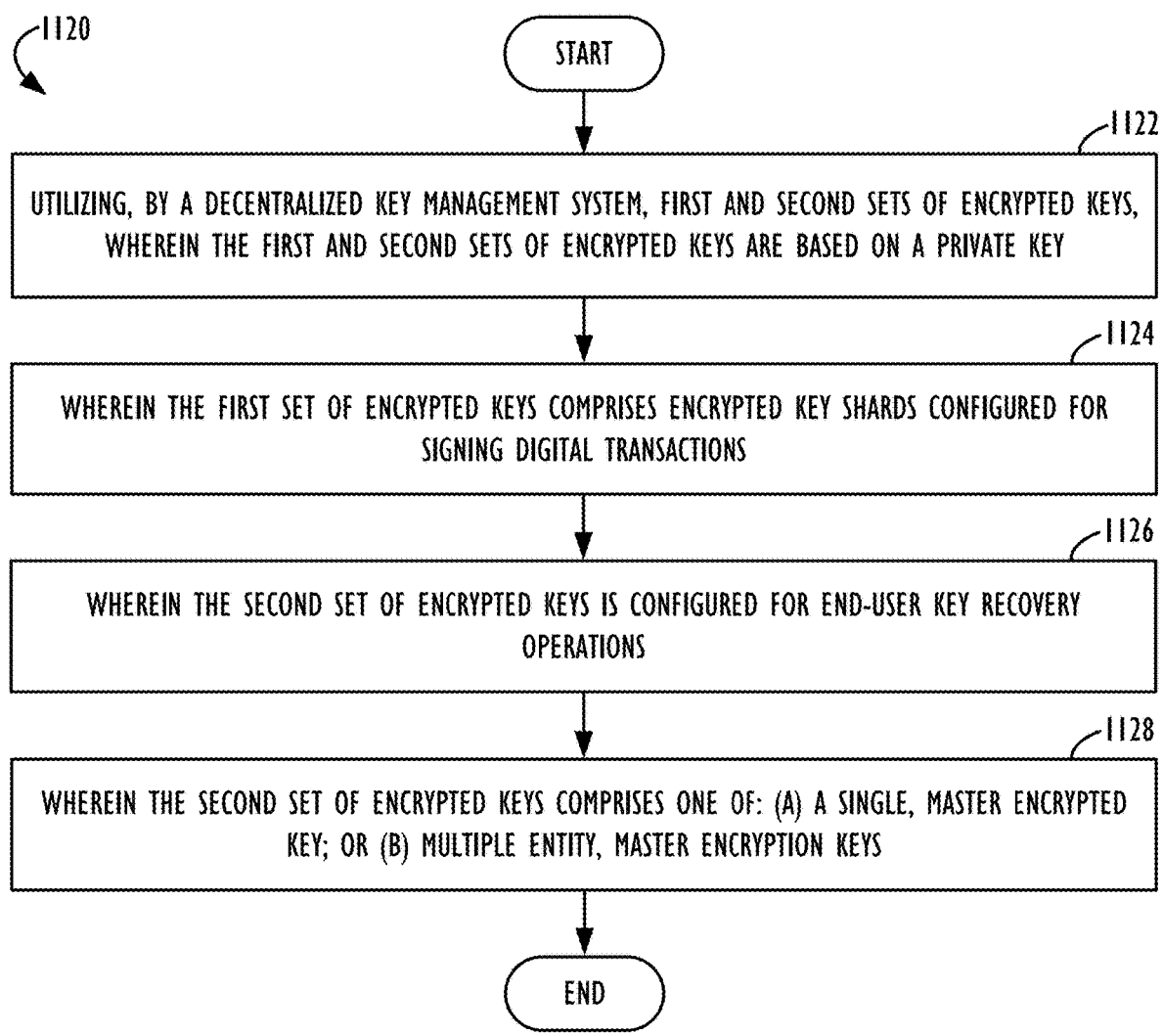

Referring now to FIGS. 11A-11C, flowcharts illustrating exemplary methods for performing the various operations described herein are shown, according to one or more disclosed embodiments.

Turning first to FIG. 11A, a flowchart for a method 1100, is shown. First at block 1102, the method 1100 may begin by monitoring, using at least one third party service provider, whether a first shard storage entity and a second shard storage entity are in compliance with a predetermined set of operational criteria. Next, at block 1104, in response to determining, by the at least one third party service provider, that either the first shard storage entity or the second shard storage entity are not in compliance with the predetermined set of operational criteria (e.g., legal and/or technical criteria), the method 1100 may proceed by transmitting, by the at least one third party service provider, a request to a key escrow provider to cause the key escrow provider to release master decryption keys for one or more end-users of the first shard storage entity or the second shard storage entity.

Turning next to FIG. 11B, a flowchart for a method 1110, is shown. First at block 1112, the method 1110 may begin by mediating, by at least one third party service provider, end-user data recovery operations. According to some embodiments, at block 1114, the end-user data recovery operations may be triggered whenever either a first shard storage entity or a second shard storage entity are not in compliance with a predetermined set of operational criteria (e.g., legal and/or technical criteria).

Turning next to FIG. 11C, a flowchart for a method 1120, is shown. First at block 1122, the method 1120 may begin by utilizing, by a data-splitting DKMS, first and second sets of encrypted keys, wherein the first and second sets of encrypted keys are based on a private key. According to some embodiments, at block 1124, the first set of encrypted keys comprises encrypted key shards configured for signing digital transactions for submission to a blockchain or some other decentralized network. According to other embodiments, at block 1126, the second set of encrypted keys is configured for end-user key recovery operations. Finally, according to still other embodiments, at block 1128, the second set of encrypted keys may comprise one of: (a) a single, master encrypted key; or (b) multiple entity, master encryption keys.

Figure 12:
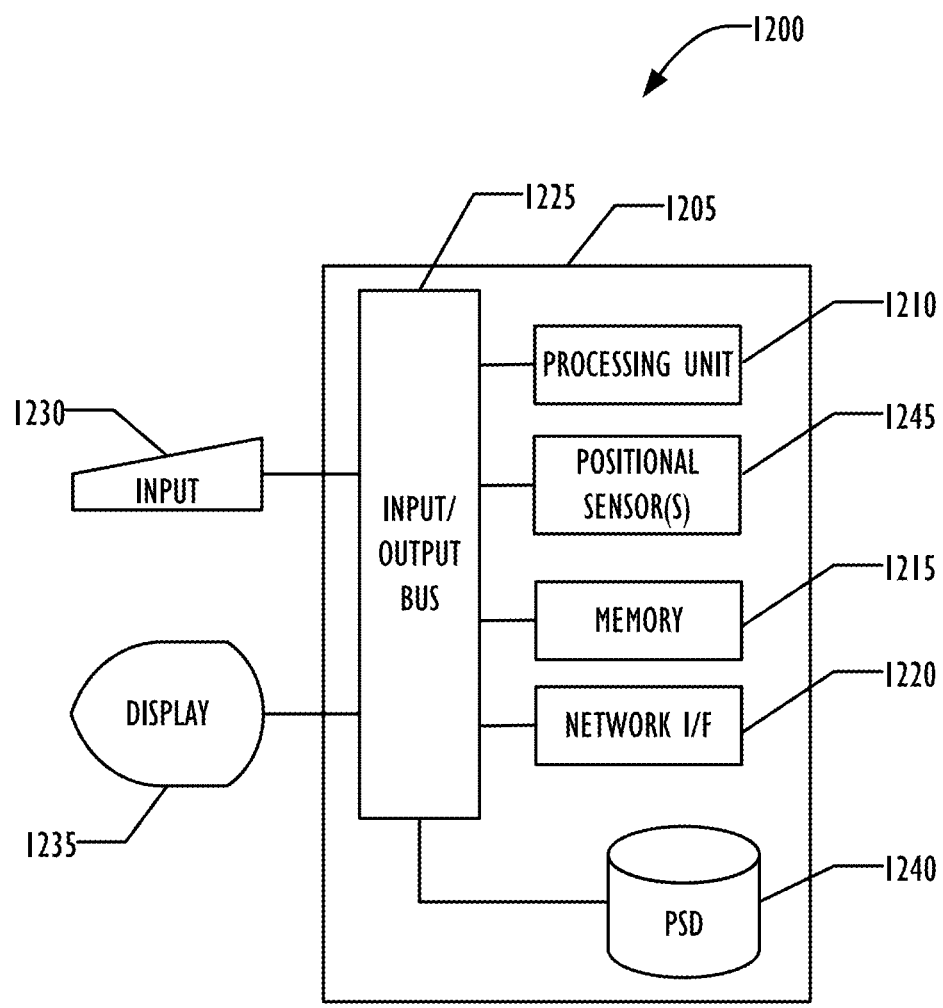
FIG. 12 is a block diagram illustrating a computer which could be used to execute the various operations described herein, according to one or more of disclosed embodiments.

Referring now to FIG. 12, an example processing device 1200 for use in the various operations described herein is illustrated in block diagram form, according to one or more disclosed embodiments. Processing device 1200 may serve in, e.g., a mobile phone, end user computer, or a server computer. Example processing device 1200 comprises a system unit 1205 which may be optionally connected to an input device 1230 (e.g., keyboard, mouse, touch screen, etc.) and display 1235. A program storage device (PSD) 1240 (sometimes referred to as a hard disk, flash memory, or non-transitory computer readable medium) is included with the system unit 1205. Also included with system unit 1205 may be a network interface 1220 for communication via a network (either cellular or computer) with other mobile and/or embedded devices (not shown). Network interface 1220 may be included within system unit 1205 or be external to system unit 1205. In either case, system unit 1205 will be communicatively coupled to network interface 1220. Program storage device 1240 represents any form of non-volatile storage including, but not limited to, all forms of optical and magnetic memory, including solid-state storage elements, including removable media, and may be included within system unit 1205 or be external to system unit 1205. Program storage device 1240 may be used for storage of software to control system unit 1205, data for use by the processing device 1200, or both.

System unit 1205 may be programmed to perform methods in accordance with this disclosure. System unit 1205 comprises one or more processing units, input-output (I/O) bus 1225 and memory 1215. Access to memory 1215 can be accomplished using the communication bus 1225. Processing unit 210 may include any programmable controller device including, for example, a mainframe processor, a mobile phone processor, or desktop class processor. Memory 1215 may include one or more memory modules and comprise random access memory (RAM), read only memory (ROM), programmable read only memory (PROM), programmable read-write memory, and solid-state memory. As also shown in FIG. 12, system unit 1205 may also include one or more positional sensors 1245, which may comprise an accelerometer, gyroscope, global positioning system (GPS) device, or the like, and which may be used to track the movement of user client devices.

Figure 13:
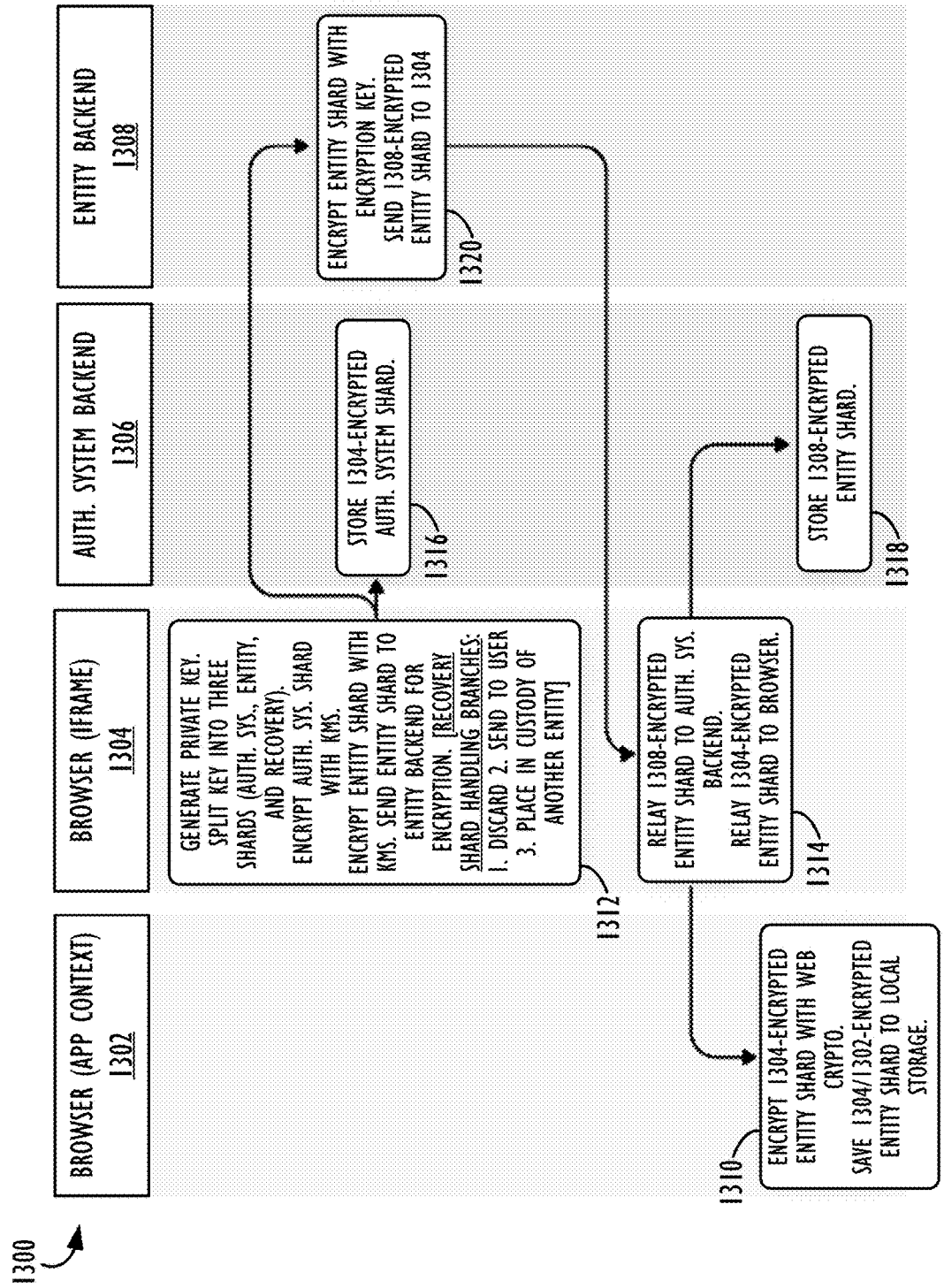
FIG. 13 is a block diagram illustrating a key generation process for a new user sign up operation, according to one or more disclosed embodiments.

Turning now to FIG. 13, a block diagram 1300 illustrating a key generation process for a new user sign up operation is shown, according to one or more disclosed embodiments of the data-splitting DKMS. The first "lane" in block diagram 1300 illustrates actions taken by a browser (e.g., an application context, such as a dApp, within a web browser) 1302, while the second lane in block diagram 1300 illustrates actions taken by an iFrame of the browser 1304, the third lane in block diagram 1300 illustrates actions taken by an authentication system backend 1306, and the fourth lane in block diagram 1300 illustrates actions taken by another Entity's backend 1308. Authentication system backend 1306 is substantially similar to authentication system 104 shown in FIG. 1. While FIG. 13 will be described predominantly in the context of the use of an iFrame, it is to be understood that, in other implementations, a mobile device application context may be utilized, including a device-specific secure enclave.

Entity backend 1308 is similar to Entity A, as shown, e.g., in FIG. 1 and FIG. 5. One difference is that Entity backend 1308 does not need to share its encryption key with the browser, and instead returns encrypted or decrypted payloads with an encryption key that it keeps secret. In one or more implementations, Entity backend 1308 uses a KMS to return encrypted or decrypted payloads. In such implementations, the KMS used by Entity backend 1308 differs from the KMS used by the iFrame of browser 1304.

As mentioned above, and shown beginning in step 1312, in some implementations disclosed herein, novel split private key generation techniques may begin with a newly-generated private key being split into at least three shards at the iFrame of browser 1304, e.g., an authentication service provider shard, a shard for another Entity, and a recovery shard. Recall that the iFrame of browser 1304 is inaccessible by the dApp or SDK. Recovery shard handling may involve one or more of the following options: 1) discarding the recovery shard; 2) sending the recovery shard to the user; or 3) placing the recovery shard in the custody of another entity. According to one implementation, placing the recovery shard in the custody of another entity may comprise practicing the following steps: 1) The user provides a secret phrase to the iFrame of the browser 1304 during signup. 2) The recovery shard is generated within the iFrame of the browser 1304 and then immediately encrypted with the secret phrase. 3) The encrypted recovery shard is sent to the recovery entity via an API call along with a user identifier that can be used to retrieve the encrypted recovery shard. 4) When this shard needs to be accessed, the iFrame of the browser 1304 requests the recovery entity API with the user identifier and retrieves the encrypted recovery shard. 5) The user provides their secret phrase to the iFrame of the browser 1304, which can be used to decrypt the encrypted recovery shard. According to another implementation, placing the recovery shard in the custody of another entity may comprise practicing the following steps: 1) Upon user wallet creation, the user is redirected to the recovery entity. 2) The user authenticates or creates an account with recovery entity, and a token is granted with the ability to upload the recovery shard to the recovery entity. This token is relayed from the recovery entity to the iFrame of the browser 1304. 3) The iFrame of the browser 1304 calls an API on the recovery entity with the token obtained from Step 2) with the user's recovery shard. 4) When the shard needs to be accessed, the user logs into the recovery entity, and the raw unencrypted shard is returned directly to the user. 5) The user provides the unencrypted shard to the iFrame of the browser 1304, and the full key can be reconstructed using either the Entity backend 1308 shard or the authentication system backend 1306 shard.

FIG. 13 also illustrates that, at step 1312, the iFrame of the browser 1304 may initiate the encryption of the authentication system's shard and Entity's shard with a KMS, e.g., as performed by one or more HSMs. Specifically, the iFrame of the browser 1304 bypasses the authentication system backend 1306 and sends the unencrypted versions of the authentication system's and the Entity's shard to the KMS for encryption. By bypassing the authentication system backend 1306, the unencrypted private key and/or shards are not exposed to the authentication system backend 1306. The iFrame of the browser 1304 also sends, bypassing the authentication system backend 1306, the Entity's unencrypted shard to Entity backend 1308 for encryption. Recall that Entity backend 1308 operates in a separate domain or environment from the authentication system backend 1306. According to some implementations, because both the authentication system shard and the Entity's shard is initially encrypted by KMS, e.g., using techniques such as those described in the '321 patent, and the encrypted Entity's shard is stored locally on the client device, there is no need for a call to Entity backend 1308's API for each key access, thereby optimizing access times on the front end. An API call to the Entity backend 1308 is needed for instances where the encrypted Entity's shard has expired and/or been purged from the client device's local memory.

At step 1316, the authentication system backend 1306 stores the shard of the private key encrypted by the authentication system (also referred to in FIG. 13 as the "1304-encrypted authentication system shard"). As mentioned above, concurrently (or subsequently), at step 1320, an unencrypted version of the Entity's shard may be sent to Entity backend 1308 for encryption while bypassing the authentication system backend 1306. The Entity backend 1308 can use its own encryption key to directly encrypt the unencrypted version of the Entity's shard or send the Entity's shard to a separate KMS for encryption. The KMS utilized by the Entity backend 1308 would be a different KMS utilized by the iFrame of the browser 1304. The entity encrypted shard (also referred to in FIG. 13 as the "1308-encrypted entity shard") may then be returned to the iFrame of the browser 1304.

At step 1314, the iFrame of the browser 1304 may relay the 1308-encrypted entity shard to the authentication system backend 1306, while relaying the 1304-encrypted entity shard to the application context within the browser 1302. At Step 1318, the authentication system backend 1306 may store the 1308-encrypted entity shard to local storage. While, at Step 1310, the application context within the browser 1302 may proceed to further encrypt the 1304-encrypted entity shard using a browser identifying encryption operation (e.g., using the Web Crypto API, which is local to the user's device, and thus does not require a potentially time-consuming call out to a third party entity's API for encryption or subsequent decryptions) and then save the resulting 1304/1302-encrypted entity shard to local storage. One benefit of using a browser identifying encryption operation on the entity shard is that the encryption key provided by Web Crypto API is unique per web client. The encryption scheme is such that only the browser 1302 that stores the 1304/1302-encrypted entity shard can do the initial decryption, then the KMS can fully unwrap/decrypt the shard. Notably, the browser identifying encryption operation prevents any party outside of the browser 1302 from performing the initial decryption, thereby making the 1304/1302-encrypted entity shard safe, e.g., in the event that it is compromised by the developer (or any third party without direct access to browser 1302).

It is to be understood that, if necessary, a user sign on action may be performed to authenticate the user, i.e., prior to the performance of the key generation process 1300 shown in FIG. 13. For example, a user may initiate an email or SMS-based log-in attempt with the authentication system. The authentication system may then send an appropriate authentication challenge to the user's email/SMS and, upon successful response to the authentication challenge, the user may receive a session token. Finally, the authentication system may generate a private key, e.g., via an iFrame of the user's browser, and then the key generation process may proceed as described above, with reference to FIG. 13.

Figure 14:
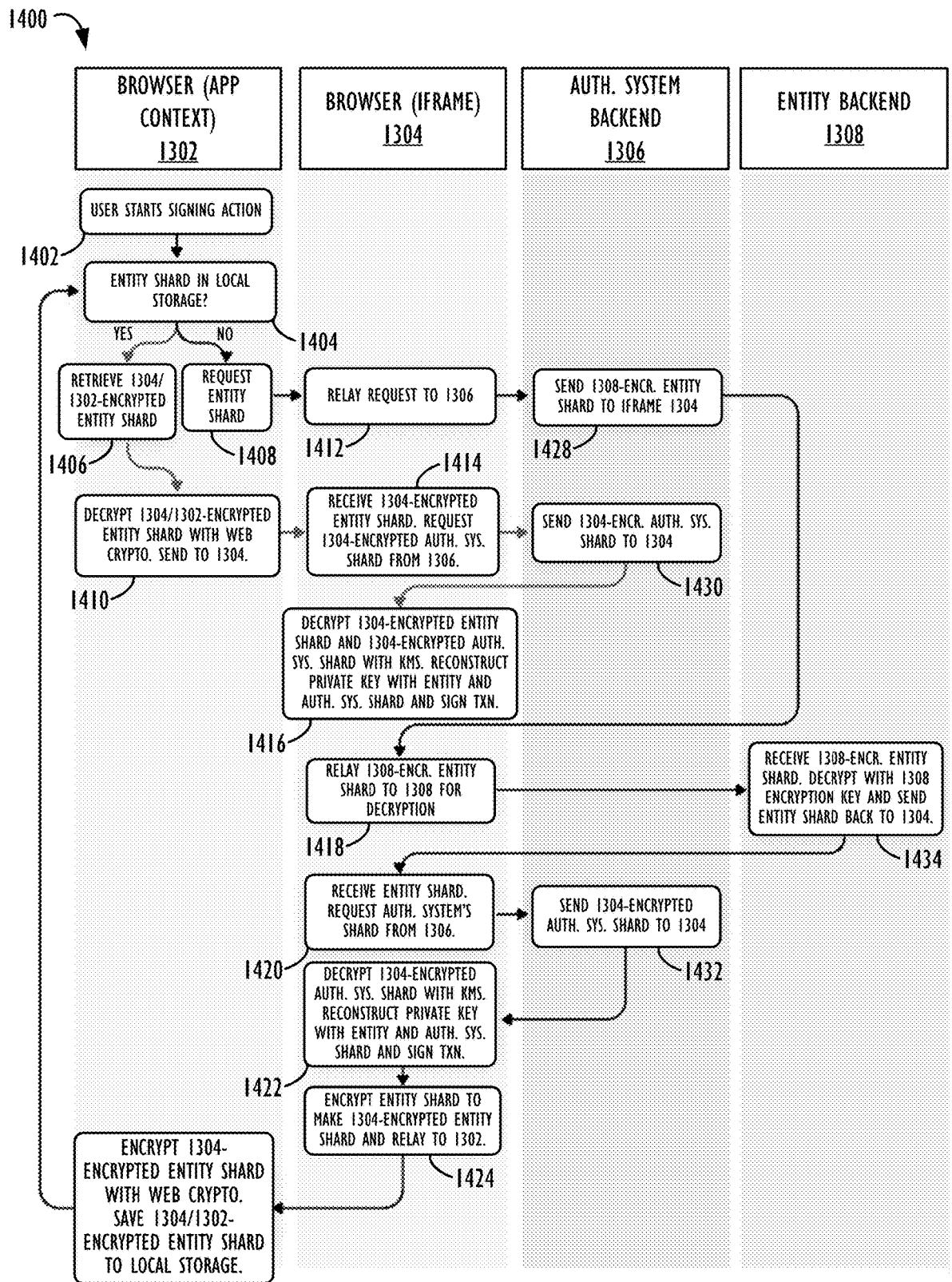
FIG. 14 is a block diagram illustrating a key reconstruction and transaction signing process for an existing user, according to one or more disclosed embodiments.

Turning now to FIG. 14, a block diagram 1400 illustrating a key reconstruction and transaction signing process for an existing user is shown, according to one or more disclosed embodiments of the data-splitting DKMS. (Note: The four lanes of FIG. 14, i.e., 1302/1304/1306/1308, refer to the four commonly-numbered entities referred to and described above with reference to FIG. 13.) As mentioned above, in some implementations, an iFrame of the browser 1304 may be configured to decrypt separate shards of a private key) using a KMS and then use the reconstructed private key to sign a digital transaction for submission to a blockchain or some other decentralized network (or perform another task, as desired, that requires the use of a private key in its entirety).

First, at step 1402, the process may begin by a user initiating a signing action. The signing action could include a user account being authenticated by the authentication system backend 1306 and providing a time-bound or time-limited access token to the client device (e.g., as described in more detail in the '321 patent). Then, at Step 1404, the application context within the browser 1302 may make a check to determine if there is an encrypted Entity shard for the private key in local storage. If there is an encrypted Entity shard for the private key in local storage (i.e., "YES" at step 1404), the process may proceed to step 1406 and retrieve the 1304/1302-encrypted entity shard from the local storage. By having the encrypted Entity shard stored locally, the client device (e.g., iFrame of the browser 1304) does not need to make an API call to Entity backend 1308 each time a signing transaction takes place, thereby optimizing access times on the front end. In other words, the client device can use the encrypted Entity shard multiple time without making multiple API calls to Entity backed 1308 before the 1304/1302-encrypted entity shard expires and/or is purged from local memory.

At step 1410, the application context (e.g., dApp) within the browser 1302 may next decrypt the 1304/1302-encrypted entity shard to verify the identity of browser 1302, e.g., using the Web Crypto API, and then send the partially-decrypted shard, i.e., which will now be referred to as only the 1304-encrypted entity shard, to the iFrame of the browser 1304. At step 1414, the iFrame of the browser 1304 may receive the 1304-encrypted entity shard and request the 1304-encrypted authentication system shard from the authentication system backend 1306. At step 1430, the authentication system backend 1306 may return the 1304-encrypted authentication shard to the iFrame of the browser 1304. Finally, at step 1416, the iFrame of the browser 1304 may decrypt the 1304-encrypted entity shard and the 1304-encrypted authentication system shard with KMS, thereby allowing it to reconstruct the entire private key (i.e., with both the entity and authentication system shards) and sign the transaction for submission to a blockchain or some other decentralized network. Decrypting with KMS can be a similar process as described in the '321 patent. In one or more implementations, to reconstruct the entire private key with two shards, the iFrame of the browser 1304 utilizes a sharing algorithm, e.g., Shamir's Secret Sharing (SSS) to reconstruct a private key by having a majority of the full set of shards, e.g., 2 out of 3 shards.

Returning back to step 1404, if, instead, there is not an Entity shard for the private key in local storage (i.e., "NO"

at step 1404), the process may proceed to step 1408 and request the entity shard directly from Entity backed 1308. Next, at step 1412, the iFrame of the browser 1304 may relay the request to the authentication system backend 1306 since authentication system backend 1306 stores the 1308-encrypted entity shard as shown in step 1318 in FIG. 13. At step 1428, authentication system backend 1306 may send the 1308-encrypted entity shard back to the iFrame of the browser 1304. Next, at Step 1418, the iFrame of the browser 1304 may relay the 1308-encrypted entity shard back to the Entity backed 1308 for decryption. As shown in FIG. 14, the 1308-encrypted entity shard is sent from iFrame of the browser 1304 to Entity backed 1308, bypassing authentication system backend 1306. At step 1434, the entity backed 1308 may receive the 1308-encrypted entity shard, decrypt it with entity 1308's decryption key, and then send the decrypted entity shard back to the iFrame of the browser 1304, again bypassing the authentication system backend 1306. At step 1420, iFrame of the browser 1304 receives the decrypted entity shard and requests the authentication system's shard from the authentication system backend 1306. At step 1432, the authentication system backend 1306 responds by returning the 1304-encrypted authentication system shard to the iFrame of the browser 1304. At step 1422, the iFrame of the browser 1304 decrypts the 1304-encrypted authentication system shard with KMS and is then able to reconstruct the entire private key with both the entity and authentication system shards (e.g., using SSS) and sign the transaction for submission to a blockchain or some other decentralized network.

At step 1424, the process may continue by encrypting the entity shard with a KMS, thereby producing a 1304-encrypted entity shard, which may then be relayed to the application context within the browser 1302. Finally, at step 1426, the browser 1302 may encrypt the 1304-encrypted entity shard with a browser identifying encryption operation, e.g., via the Web Crypto API, and then save the resulting 1304/1302-encrypted entity shard to local storage. Process flow may return to step 1404 and then, the next time the process checks to determine whether there is an encrypted version of the entity shard in storage at Step 1404, the answer would be "YES" at Step 1404. For account recovery flows, the private key may be reconstructed in the same fashion as described in the transaction signing flow of FIG. 14. It is also to be understood that, while described primarily in the context of private keys used in a Web 3.0 context, the techniques of FIG. 13 and FIG. 14 could similarly be applied to other types of data, e.g., healthcare data, PII, or any other private user data sent into the iFrame for encryption.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and it may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other, and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A method of decentralized key management, comprising: causing a Client to initiate, via a browser, digitally signing of a transaction for submission to a blockchain using a private key associated with a user account of a decentralized application (dApp);
   causing the client to retrieve a browser encrypted entity shard of the private key;
   causing the client to decrypt the browser encrypted entity shard of the private key that verifies the identity of the browser and generates a key management system (KMS) encrypted entity shard;
   causing the client to receive a KMS encrypted authentication system shard of the private key from an authentication system;
   causing the client to send, bypassing the authentication system, the KMS encrypted entity shard of the private key and the KMS encrypted authentication system shard of the private key for decryption at a third-party KMS;
   causing the client to receive a decrypted entity shard of the private key and a decrypted authentication system shard of the private key from the third-party KMS; and
   causing the client to reconstruct the private key for signing the transaction from the decrypted entity shard of the private key and the decrypted authentication system shard of the private key.

2. The method of claim 1, wherein the client reconstructs the private key within the iFrame of the browser.

3. The method of claim 1, wherein the browser encrypted entity shard of the private key is retrieved from storage local to the browser.

4. The method of claim 1, further comprising:
   causing the client to determine whether the browser encrypted entity shard of the private key is stored on the client;
   causing the client to request for an entity encrypted entity shard based on a determination that the browser encrypted entity shard of the private key is not stored on the client;
   causing the client to receive the entity encrypted entity shard from the authentication system; and
   causing the client to send the entity encrypted entity shard to an entity system for decryption, wherein the entity system is separate from the authentication system.

5. The method of claim 1, wherein the browser's encryption of the entity shard of the private key is decrypted in the browser using a Web Crypto API.

6. The method of claim 1, further comprising:
causing the client to send the decrypted entity shard of the private key to the KMS after reconstructing the private key;
causing the client to receive the KMS encrypted entity shard of the private key from the KMS;
causing the client to encrypt the KMS encrypted entity shard with a browser identifying encryption operation to generate the browser encrypted entity shard; and
causing the client to store the browser encrypted entity shard in local memory.

7. One or more non-transitory computer-readable media having stored thereon computer-executable instructions for causing one or more processors, when programmed thereby, to be able to perform operations comprising:
causing a Client to initiate, digitally signing of a transaction for submission to a decentralized network using a private key associated with a user account of a decentralized application (dApp);
causing the client to retrieve a browser encrypted entity shard of the private key;
causing the client to decrypt the browser encrypted entity shard of the private key to generate a KMS encrypted entity shard;
causing the client to receive a KMS encrypted authentication system shard of the private key from an authentication system;
causing the client to send, bypassing the authentication system, the KMS encrypted entity shard of the private key and the KMS encrypted authentication system shard of the private key for decryption at a KMS;
causing the client to receive a decrypted entity shard of the private key and a decrypted authentication system shard of the private key from the KMS; and
causing the client to reconstruct the private key for signing the transaction from the decrypted entity shard of the private key and the decrypted authentication system shard of the private key.

8. The one or more non-transitory computer-readable media of claim 7,
wherein the client reconstructs the private key within a secure execution environment of the browser.

9. The one or more non-transitory computer-readable media of claim 7, wherein the instructions, when executed, further cause the one or more processors to:
cause the client to send the decrypted entity shard of the private key to the KMS after reconstructing the private key;
cause the client the receive the KMS encrypted entity shard of the private key from the KMS;
cause the client to encrypt the KMS encrypted entity shard with a browser identifying encryption operation to generate the browser encrypted entity shard; and
cause the client to store the browser encrypted entity shard in local memory.

10. The one or more non-transitory computer-readable media of claim 7, wherein the instructions, when executed, further cause the one or more processors to:
causing the client to determine whether the browser encrypted entity shard of the private key is stored on the client;
causing the client to request for an entity encrypted entity shard based on a determination that the browser encrypted entity shard of the private key is not stored on the client; and
causing the client to receive the entity encrypted entity shard from the authentication system; and
causing the client to send the entity encrypted entity shard to an entity system for decryption, wherein the entity system is separate from the authentication system.

11. The one or more non-transitory computer-readable media of claim 7, wherein the browser encrypted entity shard of the private key is decrypted in a browser of the client using a Web Crypto API.

12. The one or more non-transitory computer-readable media of claim 7, wherein the browser encrypted entity shard of the private key is decrypted in a browser of the client using a Web Crypto API.

13. The one or more non-transitory computer-readable media of claim 7, wherein the iFrame of a browser of the client sends the KMS encrypted entity shard of the private key and the KMS encrypted authentication system shard of the private key to the KMS for decryption.

14. The one or more non-transitory computer-readable media of claim 7, wherein the iFrame of a browser of the client receives the decrypted entity shard of the private key and the decrypted authentication system shard of the private key from the KMS.

15. One or more non-transitory computer-readable media having stored thereon computer-executable instructions for causing one or more processors, when programmed thereby, to be able to perform operations comprising:
receiving a request from a user account associated with decentralized application (dApp) to digitally sign a transaction for submission to a decentralized network using a private key;
retrieving an entity shard of the private key from an entity service and bypassing an authentication service, wherein the entity shard of the private key has been decrypted by the entity service;
retrieving an encrypted authentication system's shard of the private key from an authentication service;
decrypting the encrypted authentication system's shard of the private key using a third-party key management system (KMS);
sending, bypassing the authentication service, the encrypted authentication system's shard of the private key to the third-party KMS;
reconstructing the private key from the decrypted entity shard of the private key and the decrypted authentication system shard of the private key; and
signing the transaction with the reconstructed private key.

16. The one or more non-transitory computer-readable media of claim 15, wherein the instructions, when executed, further cause the one or more processors to:
encrypt the decrypted entity shard with the third-party KMS in response to decrypting the private key to generate a KMS-encrypted entity shard.

17. The one or more non-transitory computer-readable media of claim 16, wherein the instructions, when executed, further cause the one or more processors to:
encrypt the KMS-encrypted entity shard in a browser using a Web Crypto API to generate a browser-encrypted and KMS-encrypted entity share.

18. The one or more non-transitory computer-readable media of claim 17, wherein the instructions, when executed, further cause the one or more processors to:
save the browser-encrypted and KMS-encrypted entity shard in storage local to the browser.

19. The one or more non-transitory computer-readable media of claim 18, wherein the instructions, when executed, further cause the one or more processors to:
determine whether the browser-encrypted and KMS-encrypted entity shard is stored local to the browser; and decrypt the browser-encrypted and KMS-encrypted entity shard to verify the identity of the browser and generate the KMS-encrypted entity shard.

\* \* \* \* \*